United States Patent
Rao et al.

(10) Patent No.: US 12,117,533 B1
(45) Date of Patent: Oct. 15, 2024

(54) SYSTEM AND METHOD FOR HYBRID PRECISE POINT POSITIONING AND REAL-TIME KINEMATIC POSITION ESTIMATION

(71) Applicant: Zephr.xyz Inc., Louisville, CO (US)

(72) Inventors: Pramukta Rao, Potomac, MD (US); Sean Gorman, Louisville, CO (US); Scott Nelson, Louisville, CO (US); Kostas Stamatiou, Boulder, CO (US)

(73) Assignee: ZEPHR.XYZ INC., Louisville, CO (US)

( * ) Notice: Subject to any disclaimer, the term of this patent is extended or adjusted under 35 U.S.C. 154(b) by 0 days.

(21) Appl. No.: 18/519,096

(22) Filed: Nov. 27, 2023

Related U.S. Application Data

(63) Continuation-in-part of application No. 18/335,117, filed on Jun. 14, 2023, which is a continuation-in-part of application No. 18/297,005, filed on Apr. 7, 2023.

(51) Int. Cl.
*G01S 19/07* (2010.01)
*G01S 19/41* (2010.01)
*G01S 19/44* (2010.01)

(52) U.S. Cl.
CPC ........... *G01S 19/071* (2019.08); *G01S 19/41* (2013.01); *G01S 19/44* (2013.01)

(58) Field of Classification Search
None
See application file for complete search history.

(56) References Cited

U.S. PATENT DOCUMENTS

| | | | |
|---|---|---|---|
| 8,659,474 B2 | 2/2014 | Dai et al. | |
| 9,596,570 B1 * | 3/2017 | Cardoso de Moura | H04L 67/52 |
| 11,675,091 B2 | 6/2023 | Wang et al. | |
| 2019/0196024 A1 * | 6/2019 | Chen | G01S 19/44 |
| 2022/0057530 A1 * | 2/2022 | Wang | G01S 19/44 |
| 2022/0283314 A1 * | 9/2022 | Luo | G01S 19/07 |

* cited by examiner

*Primary Examiner* — Adolf Dsouza
(74) *Attorney, Agent, or Firm* — Galvin Patent Law LLC; Brian R. Galvin

(57) ABSTRACT

Accuracy of Global Navigation Satellite System (GNSS) for GNSS devices is improved using a GNSS positioning system that leverages networked optimization for enhanced accuracy. GNSS measurements from multiple devices form the foundation for a massive pairwise optimization approach. This fuels a self-reinforcing cycle, wherein Real Time Kinematic (RTK) pairwise optimizations support Precise Point Positioning (PPP) analysis. Improved PPP calculations in turn refine RTK optimization, rapidly iterating towards convergence. The PPP-RTK feedback loop refines positions iteratively, culminating in more accurate user locations.

2 Claims, 14 Drawing Sheets

SYSTEM AND METHOD FOR HYBRID PRECISE POINT POSITIONING AND REAL-TIME KINEMATIC POSITION ESTIMATION

CROSS-REFERENCE TO RELATED APPLICATIONS

Priority is claimed in the application data sheet to the following patents or patent applications, each of which is expressly incorporated herein by reference in its entirety:
Ser. No. 18/335,117
Ser. No. 18/297,005

BACKGROUND OF THE INVENTION

Field of the Art

The present invention is in the field of global navigation satellite systems (GNSS), and more particularly in the area of increasing accuracy of positioning in consumer-grade GNSS devices.

Discussion of the State of the Art

Commercial-grade GNSS devices such as surveying equipment are capable of centimeter-level positioning precision. These commercial-grade devices are typically capable of less-then-meter-level precision on their own because they are purpose-built devices with antennas, receivers, processors, software/firmware, and power sources designed specifically to enable such precision and are typically used for surveying purposes where they are held in a stationary position for extended periods of time. When combined with error correction from base stations of known locations, commercial-grade GNSS devices can provide positional accuracy as low as 1 cm to 5 cm.

To date, consumer-grade devices are unable to achieve a similar level of precision. Positional accuracy of such devices is limited due to constraints in each of these areas (antennas, receivers, processors, software/firmware, and power sources) resulting from cost concerns, design priorities, lack of specialization of the device, and other issues inherent in the design, production, and sale of consumer-grade devices. Further, consumer-grade devices are often used for locational purposes while in motion, such as during vehicle navigation, which reduces positional accuracy. As a result, consumer-grade devices have GNSS accuracies on the order of several meters. This low level of accuracy greatly limits the uses to which consumer-grade GNSS devices can be put.

Precise point positioning (PPP) is a positioning technique used to determine precise positions of a GNSS receiver using only the signals received from a constellation of satellites (e.g., GPS. GLONASS. Galileo, etc.). Precise point positioning is often used in applications that require centimeter-level accuracy, such as geodetic surveys, tectonic plate movement studies, and other scientific applications. In operation, a receiver collects raw data from multiple satellites, including signal pseudo-ranges and carrier phase measurements. PPP requires precise satellite orbit and clock information. This information is provided by global networks of reference stations that continuously track and monitor satellite positions. This data is then broadcast to PPP users to correct for the errors in satellite positions and satellite clock errors. The ionosphere and troposphere introduce delays in the GNSS signals as they pass through. PPP uses carrier phase measurements to calculate the integer number of carrier wave cycles that fit between the receiver and satellite. Resolving these integer ambiguities is a critical step in achieving high-precision positioning. PPP is often processed iteratively to refine the position estimate using various corrections and models until a precise position solution is obtained. One of the drawbacks of precise point positioning is that it typically requires a relatively long convergence time to achieve high accuracy due to the need for precise satellite orbit and clock corrections.

Real-time kinematic (RTK) is a technique that provides real-time centimeter-level positioning using carrier phase measurements from GNSS satellites. RTK requires a base station and a rover receiver. The base station is typically located at a known point with precisely known coordinates. The base station receives signals from the same satellites as the rover receiver. It computes the difference between the measured and the known coordinates. The base station sends these differential corrections, also known as Radio Technical Commission for Maritime Services (RTCM) data, to the rover receiver in real-time, correcting for errors caused by atmospheric effects, satellite orbits, and clock errors. The rover receiver uses the differential corrections from the base station to refine its position estimate in real-time. RTK relies heavily on resolving the carrier phase ambiguities, which enables the rover to achieve high-precision positioning. RTK is commonly used in applications that require real-time high-precision positioning, such as precision agriculture, construction, and surveying. One limitation of real-time kinematic is that it requires a relatively short baseline distance between the base station and the rover for optimal performance. Furthermore, the requirement of a base station with precisely known coordinates makes setting up a base station in remote or inaccessible areas can be challenging. RTK equipment, including base stations and rover receivers, can be expensive. Additionally, setting up and maintaining the required infrastructure and communication systems can be complex and costly.

What is needed is a system and method for hybrid precise point positioning and real-time kinematic position estimation which overcomes the limitations of the existing state of the art.

SUMMARY OF THE INVENTION

Accordingly, the inventor has conceived and reduced to practice, a system and method for Global Navigation Satellite System accuracy improvement for GNSS devices using a novel GNSS positioning system that leverages networked optimization for enhanced accuracy.

GNSS measurements from multiple devices form the foundation for a massive pairwise optimization approach. This fuels a self-reinforcing cycle, wherein Real Time Kinematic pairwise optimizations support Precise Point Positioning analysis. Improved PPP calculations in turn refine RTK optimization, rapidly iterating towards convergence. The PPP-RTK feedback loop refines positions iteratively, culminating in precise user locations. This method capitalizes on the interplay between PPP and RTK techniques within a networked context, offering a powerful solution for real-time, high-precision positioning applications.

According to a preferred embodiment, a system for improving positional accuracy in a Global Navigation Satellite System (GNSS) device is disclosed, comprising: a server comprising a memory and a processor; an application programming interface (API) operating on the server, the API comprising a first plurality of programming instructions stored in the memory which, when operating on the processor, causes the API to act as a network interface between applications operating on GNSS devices and a location correction engine operating on the server; and the location correction engine operating on the server comprising a second plurality of programming instructions stored in the memory which, when operating on the processor, causes the server to: receive positional information from a pair of GNSS devices via the API, the positional information comprising navigation message data from each GNSS device comprising pseudorange and carrier phase measurements; for each device, generate an estimated position value to produce an estimated double difference ambiguity measurement; use the estimated double difference ambiguity measurement and the estimated position value as an input into a real-time kinematic (RTK) algorithm, wherein the RTK algorithm computes a first position value for each of the devices; input the computed first position, the estimated position value, and the estimated double difference ambiguity measurement into a precise point positioning (PPP) algorithm, wherein the algorithm computes a second position value for each of the devices; use the second position value to update the estimated position value; calculate an error correction for the pair of GNSS devices based on the updated estimated position value; and send the error correction to the pair of GNSS devices.

According to another preferred embodiment, a method for improving positional accuracy in a Global Navigation Satellite System (GNSS) device is disclosed, comprising the steps of: receiving positional information from a pair of GNSS devices via an application programming interface, the positional information comprising navigation message data from each GNSS device comprising pseudorange and carrier phase measurements; for each device, generating an estimated position value to produce an estimated double difference ambiguity measurement; using the estimated double difference ambiguity measurement and the estimated position value as an input into a real-time kinematic (RTK) algorithm, wherein the RTK algorithm computes a first position value for each of the devices; inputting the computed first position, the estimated position value, and the estimated double difference ambiguity measurement into a precise point positioning (PPP) algorithm, wherein the algorithm computes a second position value for each of the devices; using the second position value to update the estimated position value; calculating an error correction for the pair of GNSS devices based on the updated estimated position value; and sending the error correction to the pair of GNSS devices.

BRIEF DESCRIPTION OF THE DRAWING FIGURES

DETAILED DESCRIPTION OF THE INVENTION

Figure 1:
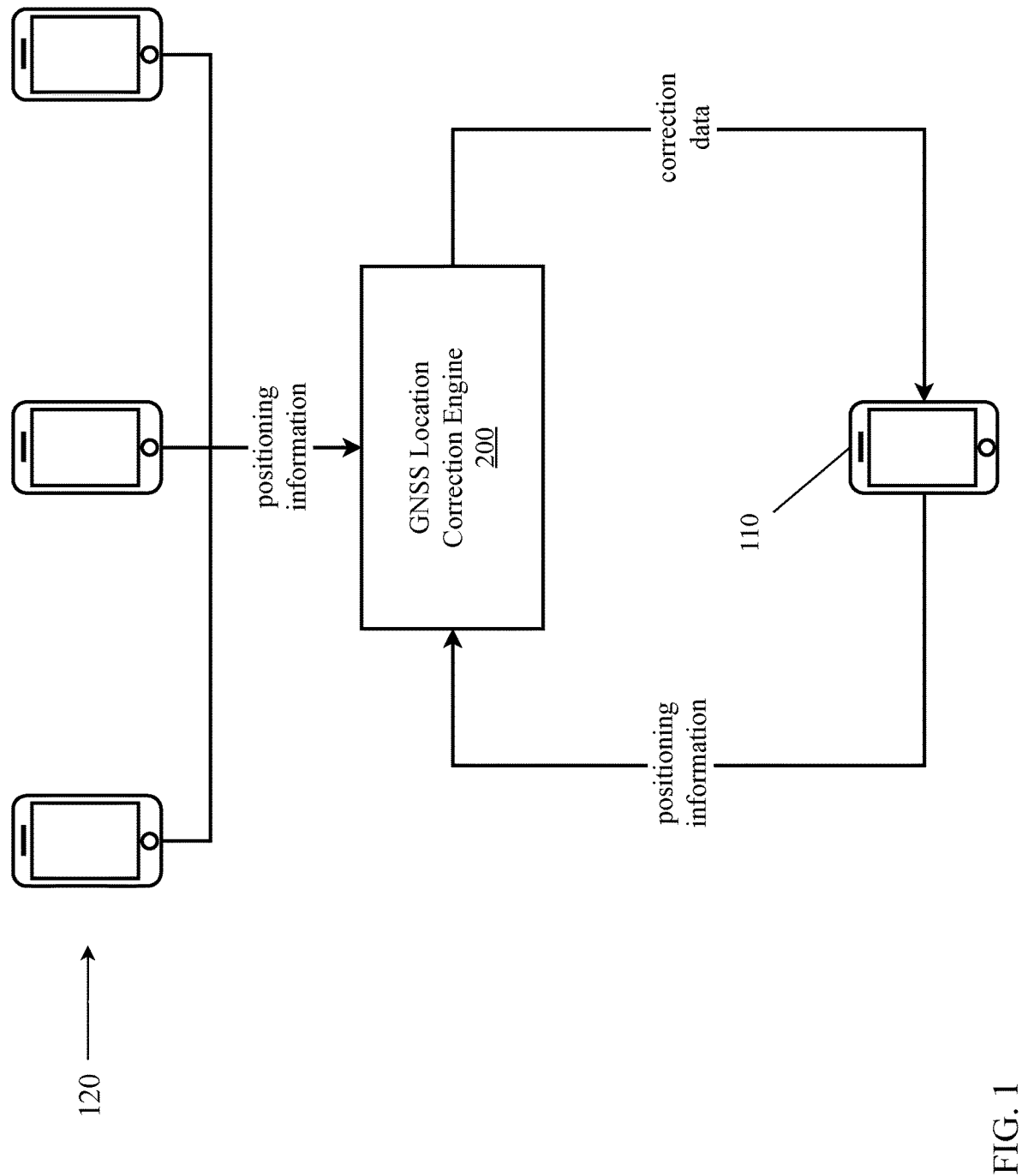
FIG. 1 is a block diagram illustrating an exemplary system architecture for a GNSS accuracy improvement system.

The inventor has conceived, and reduced to practice, a system and method for Global Navigation Satellite System accuracy improvement for GNSS devices using a novel GNSS positioning system that leverages networked optimization for enhanced accuracy. GNSS measurements from multiple devices form the foundation for a massive pairwise optimization approach. This fuels a self-reinforcing cycle, wherein Real Time Kinematic pairwise optimizations support Precise Point Positioning analysis. Improved PPP calculations in turn refine RTK optimization, rapidly iterating towards convergence. The PPP-RTK feedback loop refines positions iteratively, culminating in precise user locations. This method capitalizes on the interplay between PPP and RTK techniques within a networked context, offering a powerful solution for real-time, high-precision positioning applications.

The new wave of artificial intelligence breakthroughs has been underpinned by a growing set of powerful computational tools. Specifically, these tools are exceedingly well-suited for optimization and calculating sophisticated loss functions when modeling complex real-world phenomena. These advancements have opened the door to no longer viewing the best approach to GNSS location as a single point solution. Instead, GNSS can be viewed as a networked problem where GNSS measurements from each device are used to fuel massive pairwise optimization. This optimization creates a virtuous feedback loop where the precise point positioning technique creates an anchor position for the real-time kinematic pairwise optimizations, which in turn improves the PPP calculation that then improves the RTK optimization. This feedback loop quickly iterates until it converges on the precise location of all devices.

Precise point positioning is a positioning technique used to determine precise positions of a GNSS receiver using only the signals received from a constellation of satellites (e.g., GPS, GLONASS, Galileo, etc.). PPP is often used in applications that require centimeter-level accuracy, such as geodetic surveys, tectonic plate movement studies, and other scientific applications. In operation, a receiver collects raw data from multiple satellites, including signal pseudo-ranges and carrier phase measurements. PPP requires precise satellite orbit and clock information. This information is provided by global networks of reference stations that continuously track and monitor satellite positions. This data is then broadcast to PPP users to correct for the errors in satellite positions and satellite clock errors. The ionosphere and troposphere introduce delays in the GNSS signals as they pass through. In some embodiments, models are used to estimate and correct for these delays. PPP uses carrier phase measurements to calculate the integer number of carrier wave cycles that fit between the receiver and satellite. Resolving these integer ambiguities is a critical step in achieving high-precision positioning. PPP is often processed iteratively to refine the position estimate using various corrections and models until a precise position solution is obtained. One of the drawbacks of precise point positioning is that it typically requires a relatively long convergence time to achieve high accuracy due to the need for precise satellite orbit and clock corrections.

Real-time kinematic is a technique that provides real-time centimeter-level positioning using carrier phase measurements from GNSS satellites. RTK requires a base station and a rover receiver. The base station is typically located at a known point with precisely known coordinates. The base station receives signals from the same satellites as the rover receiver. It computes the difference between the measured and the known coordinates. The base station sends these differential corrections (also known as RTCM data) to the rover receiver in real-time, correcting for errors caused by atmospheric effects, satellite orbits, and clock errors. The rover receiver uses the differential corrections from the base station to refine its position estimate in real-time. RTK relies heavily on resolving the carrier phase ambiguities, which enables the rover to achieve high-precision positioning. RTK is commonly used in applications that require real-time high-precision positioning, such as precision agriculture, construction, and surveying. One limitation of real-time kinematic is that it requires a relatively short baseline distance between the base station and the rover for optimal performance.

Today, commercial-grade GNSS devices are capable of 1 cm to 5 cm accuracy in good conditions. These systems use the normal code phase timing data that is universally available, along with carrier phase data and correction information provided from known reference sources (also known as base stations) whose locations are known with a great deal of precision. Commercial-grade GNSS receivers are purpose-built devices with well-calibrated geodetic antennas, receivers, processors, software/firmware, and power sources specifically engineered to minimize hardware interference and other sources of error, and maximize the accuracy of GNSS positioning. They are typically used for surveying purposes where they are held in a stationary position for extended periods of time which also maximizes positional accuracy. When combined with error correction from base stations of known locations, commercial-grade GNSS devices can provide positional accuracy as low as 1 cm to 5 cm.

Consumer-grade GNSS devices, on the other hand, are designed and built with many compromises that reduce the accuracy of GNSS positioning. As they are consumer-grade devices, the retail price of the device is a major consideration, leading to compromises in hardware component selection. Size is also a major consideration, reducing the space on the device available for antennas and power sources and dictating their location, which is typically sub-optimal for GNSS purposes. Further, the vast majority of consumer-grade GNSS devices in use are mobile phones, which are multi-purpose devices of which GNSS positioning is only one. The multi-purpose nature of mobile phones leads to further design compromises as the GNSS capabilities of the device must compete with other functions of the device for device resources such as space on the device, processing power, and battery life. As a result, consumer-grade GNSS devices are typically capable of GNSS positioning accuracy only on the order of several meters to tens of meters.

A particular example of lower-grade componentry in consumer-grade GNSS devices are the inexpensive GNSS antennas in mobile phones. Mobile phones use an omnidirectional linearly or elliptically polarized antenna due to the unknown orientation of the phone in three-dimensional space. These antennas have advantages in terms of received signal strength and the number of received signals, but have low gain and are very sensitive to multi-path effects, which is non-optimal for GNSS positioning purposes. Other phone components, like the screen of the device and other transmitting antennas (Wi-Fi, Bluetooth), affect the smartphone antenna, leading to reception pattern irregularities for which correction is difficult.

In order to achieve centimeter-level positioning on consumer-grade GNSS devices, corrections to positioning data must account for both device-specific sources of error and non-device-specific sources of error. Non-device-specific sources of error include traditional sources of error (e.g., errors associated with ephemeris, clocks and timing, satellite health, ionospheric corrections, and satellite constellation changes) which are addressed by GNSS systems using data from ground-based external reference stations. Corrections are made based on the reference stations and transmitted from stations on the ground to the satellites, which transmit the corrections to GNSS devices as part of the navigation message data emitted by each satellite. Further accuracy in commercial-grade GNSS devices can be obtained by receipt of data directly from an external reference station (i.e., a base station). For example, traditional Differential GPS (DGPS) and Real Time Kinematic correction schemes take advantage of spatial correlations in atmospheric errors between a nearby fixed reference station with known position and a mobile commercial-grade GNSS device, in order to enable the commercial-grade GNSS device to correct its position to centimeter level. Network RTK enhances this by using a central processing station to aggregate and interpolate data from multiple reference stations and can provide a virtual reference signal that appears to originate near client GNSS units. With a network connection, it is also possible to compute a GNSS fix server side, simply by transmitting the raw measurements to a server, and having the server run appropriate algorithms on the received data. Alternatively, instead of relying on data from reference stations, Precise Point Positioning techniques can be used to achieve similar levels of accuracy by relying on precise information about satellite orbits and clocks, along with accurate error models. Traditionally, these models suffer from a longer initial convergence period than differential techniques. Consumer-grade GNSS devices do not have the capability of receiving corrections for these sources of error from a base station. Even if the correction for traditional sources of error was provided to a consumer-grade GNSS device (e.g., via the Internet), it may or may not be sufficiently timely to provide greater accuracy on these devices due to the frequent movement of consumer-grade GNSS devices (e.g., mobile phones) while in use versus commercial-grade GNSS devices (e.g., surveying equipment).

Device-specific sources of error are often a larger source of error and are more difficult to correct for. Device-specific sources of error are due to the location, design, or orientation of the GNSS device, and include such things as multi-path errors, antenna calibration errors (e.g., phase center offsets), antenna orientation errors, non-GNSS hardware interference errors, and carrier-phase cycle slips. Device-specific sources of error are typically addressed by on-device calculations and corrections (e.g., multi-path filtering, carrier-phase cycle slip detection, etc.), and are significantly greater for consumer-grade GNSS devices because of the design constraints discussed above.

However, both device-specific and non-device-specific sources of error are highly correlated across devices, either due to spatial proximity, or device type/composition, creating opportunities for correction other than the traditional methods of external reference stations and on-device corrections. More specifically, error corrections known or calculated for one GNSS device can be applied to another GNSS device with similar characteristics such as geographical proximity, device type, operating system, antenna type, GNSS chipset, device orientation, device movement, etc. Moreover, the error corrections known or calculated for individual devices can be combined into larger collective optimization problems that solve for the location of groups of devices, along with universal, device specific, location-specific, and satellite specific errors/calibrations/correlations.

The methodology described herein uses ensemble data from a plurality of devices to estimate common error parameters across devices. Where there is a large number of GNSS devices providing data, robust estimation techniques become viable options for removing sources of error across all devices or across selected subsets of devices with similar characteristics. The result is a system and method that can provide centimeter-level GNSS positional accuracy on a network of consumer-grade GNSS devices.

A hybrid approach to precision optimization may be implemented in various embodiments described herein. In such embodiments, the total loss may be computed as the sum of an absolute positioning loss value and a relative loss positioning value. The hybrid optimization system is supported by the following mathematical models and their derivations. The mathematical models associated with the initial multi-receiver loss may be based on some prior assumptions: the solution is based on a single GNSS constellation (i.e., GPS only); the solution is based on dual-frequency observations; satellite clock bias corrections are applied to pseudorange, derived from a precise ephemeris; tropospheric correction is not applied; and receiver clock bias is modeled as a per-receiver fitting parameter.

The variables are as follows:

$D_{r,r'}$ is the True Range (Distance) between receivers r and r'.

$R_{s,r}$ is the raw code pseudorange between satellite, s, and receiver r.

$\phi_{s,r}$ is the raw carrier pseudorange between satellite, s, and receiver r.

$\tau_s$, $\tau_r$ is the satellite clock offset and receiver clock offset, respectively.

$I_{s,r}$, $T_{s,r}$ is the Ionoshperic delay and the tropospheric delay, respectively.

$X_s \rightarrow$, $X_r \rightarrow$ is the position of the satellite and receiver, respectively.

It's possible to align carrier phase information present in Accumulated Delta Range (ADR) (i.e., provided by the Android API), with the code pseudorange at a single time point and carry that forward until the receiver loses track or encounters an unrecoverable cycle slip. This results in a reasonable carrier phase observable:

$$\phi_t = ADR_t + (R_0 - ADR_0)$$

A hatch filter can be employed to smooth the code pseudorange with carrier phase data. The noisy (but ambiguous) code pseudorange measurements can be smoothed with precise (but ambiguous) carrier phase measurements.

Using two different frequencies per satellite, it's possible to construct an ionosphere-free linear combination of code and carrier pseudoranges. This has the advantage of eliminating both the contribution of the ionosphere, as well as the satellite's Timing Group Delay (TGD) between the broadcast the two broadcast signals.

$$R_{s,r} = f_{21} R(f_1)_{s,r} - f_{22} R(f_2)_{s,r} f_{21} - f_{22}$$

$$\phi^\sim_{s,r} = f_{21} \phi(f_1)_{s,r} - f_{22} \phi(f_2)_{s,r} f_{21} - f_{22}$$

These lead to the following observation models:

$$R_{s,r} = |Xs \rightarrow -Xr \rightarrow| - \tau_r + T_{s,r}$$

$$\phi^\sim_{s,r} = |Xs \rightarrow -Xr \rightarrow| - \tau_r + T_{s,r} + \lambda_{eff} N^\sim_{s,r}$$

A combination of code and carrier observables at a single frequency can be used to eliminate the contribution of the ionosphere since they differ in sign between the two observation models. The result is a single observable:

$$R_{s,r} = 1/2(R_{s,r} + \phi_{s,r}) = |Xs \rightarrow -Xr \rightarrow| - \tau_r + T_{s,r} + 1/2 \lambda N_{s,r}$$

The use of this observation model can yield maximum compatibility with receivers. In an implementation, it may be possible to correct raw signals using published total electron count (TEC) maps published by various organizations. The use of TEC maps can allow for the use of single-frequency data without introducing code noise into the system. When this observation model is applied to ensure maximum compatibility with receivers, it can result in observables equivalent to the dual-frequency Ionosphere-free combination, except with no adjustments to ambiguities being necessary.

Satellite-Receiver Loss

This may be constructed as a PPP Linear Observation Model using the ionosphere-free combination defined above.

$$L_{sat/recv} = \sum_{s,r}(R_{s,r} + \tau_r - T_{s,r} - |Xs \rightarrow -Xr \rightarrow|)2 + \sum_{s,r}(\Phi^\sim_{s,r} + \tau_r - T_{s,r} + \lambda N_{s,r} - |Xs \rightarrow -Xr \rightarrow|)2$$

$\tau_s$ is expected to be provided by the ephemeris. Since $\tau_{s,r} \approx T_{s,r'}$ for nearby receivers, that term can be replaced with $T_s$ common to all receivers. This introduces a coupling between measurements. Note that the ambiguities $N_{s,r}$ must be constrained/fixed to use this model.

Troposphere Mapping Function

A plausible model for $T_{sr}$ is $$T_{sr} = T_z\left(1 - \frac{h_r}{H}\right)\sin\sin\Phi_{sr}$$

where:
- $T_z$ is the tropospheric delay term at zenith, common to all satellites;
- $h_r$ is the receiver height;
- H is the height of the troposphere;
- $\Phi_{sr}$ is the satellite elevation angle.

Using this model and fitting $T_z$ removes the per-satellite dependence and more strongly couples the observations. According to an aspect of an embodiment, an empirical mapping function, such as, for example, the Mapping of Neill, may be used. The advantage of such an embodiment is that the system only needs to fit the zenith wet tropospheric delay and provides improved stability in the overall optimization process.

Receiver-Receiver Loss $$L_{r/r} = \propto \sum_{r,r'}(D_{r,r'} - |X_r \rightarrow -X_{r'} \rightarrow|)^2 + \beta\sum_{s,r,r'}(\lambda(\Delta(1)N_{s,r,r'} - B_{s,r,r'}) - C_{r,r'})^2$$

Where $D_{r,r'}$ is a relative distance generated by the RTK double differencing techniques, and $B_{s,r,r'}$ are single differenced ambiguities estimated (to within an offset) by a double-difference based Kalman filter. $C_{r,r'}$ are the single-differenced ambiguity offsets which must be estimated as part of the overall model. Often, $C_{r,r'}$ cannot be effectively estimated using a fit. In this situation, its sufficient to set $\beta$ to zero and use this as a soft distance constraint. This may result in a more robust system at the cost of a slower convergence rate. According to an embodiment, a hard receiver-receiver loss may be implemented. When relative distance measures are considered reliable, it may be beneficial to utilize a loss function that more closely resembles the Satellite-Receiver loss. In this model we include term for each pair of receivers as follows:

$$L_{r/r} = \propto \sum_s \left(\Phi_{s,r'} + \tau_r - T_{s,r'} + \lambda N_{s,r'} - \left|X_s \rightarrow \left(X_r + \vec{D}_{r,r'}\right)\right|\right)^2$$

Where $\vec{D}_{r,r'}$ is the displacement vector from receiver r to r' as determined by RTK double differencing.

RTK Double-Differencing

The carrier phase observed by receiver, r, from satellite s:

$$\phi_{s,r} = |Xs \rightarrow -Xr \rightarrow| = I_{s,r} + T_{s,r} + \tau_r - \tau_s + (N\lambda + \epsilon)$$

The single-difference refers to two receivers observing the same satellite:

$$\delta\phi_{s,r,r'} = \phi_{s,r} - \phi_{s,r'} = |Xs \rightarrow -Xr \rightarrow| - |Xs \rightarrow -Xr' \rightarrow| - I_{s,r} + I_{s,r'} + T_{s,r} - T_{s,r'} + \tau_s - \tau_s - \tau_r + \tau_{r'} + (N_r\lambda + \epsilon_{s,r}) - (N_{r'}\lambda + \epsilon_{s,r'}) = |Xs \rightarrow -Xr \rightarrow| - |Xs \rightarrow -Xr' \rightarrow| - \tau_r + \tau_{r'} + (N_r\lambda + \epsilon_{s,r}) - (N_{r'}\lambda + \epsilon_{s,r'}) = \Delta(1)X^{\rightarrow}_{s,r,r'} - \lambda(\Delta(1)N_{s,r,r'} + C_{r,r'}) - \tau_r + \tau_{r'}$$

This is done to eliminate the satellite clock offset term. Next, a second difference is done between two satellites:

$$\Delta(2)\phi_{s,s',r,r'} = \delta\phi_{s,r,r'} - \delta\phi_{s',r,r'} = |Xs \rightarrow -Xr \rightarrow| - |Xs \rightarrow -Xr' \rightarrow| + |Xs' \rightarrow -Xr \rightarrow| + |Xs' \rightarrow -Xr' \rightarrow| + (N_{s,r}\lambda + \epsilon_{s,r}) - (N_{s',r}\lambda + \epsilon_{s',r}) - (N_{s,r'}\lambda + \epsilon_{s,r'}) + (N_{s',r'}\lambda + \epsilon_{s',r'}) = (2)X^{\rightarrow}_{s,s',r,r'} - \lambda\Delta(2)N_{s,s',r,r'} + \epsilon$$

Note that this eliminates the received clock bias and leads to a relationship between carrier phase measurements and receiver positions that is dependent only on the ambiguities. The code measurement can be double differenced as well, leading to an identical equation except without any ambiguities (and with significant larger noise). This results in two equations:

$$\Delta(2)R_{s,s',r,r'} = \Delta(2)X^{\rightarrow}_{s,s',r,r'} + \epsilon_R$$

$$\Delta(2)\phi_{s,s',r,r'} = \Delta(2)X^{\rightarrow}_{s,s',r,r'} - \lambda\Delta(2)N_{s,s',r,r'} + \epsilon_\phi$$

Double-Differenced Ambiguity Estimation

Using the equations above, there are two or more ways to estimate the double differenced ambiguities. One way is by using the difference between code and carrier double differences. That is:

$$\Delta(2)R_{s,s',r,r'} - \Delta(2)\phi_{s,s',r,r'} = \Delta(2)N_{s,s',r,r'} + \epsilon_R - \epsilon_\phi$$

Another way is by using the estimated receiver positions to compute the double difference:

$$\Delta(2)\vec{X}(\text{estimated})_{s,s',r,r'} - \Delta(2)\phi_{s,s',r,r'} = \lambda\Delta(2)N_{s,s',r,r'} + \epsilon_\phi + \epsilon_{estimate}$$

Both methods are noisy and so require some averaging to converge to a correct result, which can be done using a Kalman filter. For each receiver, a Kalman filter can be constructed to generate the $\vec{X}$ (estimated) position values needed to produce the double differenced ambiguity measurements described above. Additionally, for each pair of receivers, the system can use the estimated double-differenced ambiguities to drive a second Kalman filter. Since the measurement only contain difference between single difference, an infinite number of valid solutions could be generated for the equation space. As a result, another condition is needed to select a particular solution when driving the filter. Conditions of the form:

$$N_{s,r} - N_{s,r'} = B_{s,r,r'} + C_{r,r'}$$

Lead to one equation per satellite for each pair of receivers (N*M*(M−1)/2), and introduce one additional unknown per pair of receivers (M*(m−1)/2). Rearranging and multiplying through by the wavelength leads to:

$$\lambda\Delta(1)N_{s,r,r'} - C_{r,r'} = \lambda B_{s,r,r'}$$

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise.

Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Commercial-grade GNSS device" or "commercial-grade device" as used herein means a GNSS-capable device typically sold to and used by professionals (e.g., surveyors) for a commercial purpose, wherein positional accuracy of the device is a fundamental concern in the device's design.

Commercial-grade GNSS devices will typically be designed and built for a specific purpose (e.g., surveying).

"Consumer-grade GNSS device" or "consumer-grade device" as used herein means a GNSS-capable device typically sold to and used by non-professionals (i.e., ordinary consumers), wherein positional accuracy is not a fundamental concern in the design of the device. Consumer-grade GNSS devices may be designed and built for a specific purpose (e.g., running and cycling computers), but the majority of consumer-grade GNSS devices currently in use are multi-purpose devices (e.g., mobile phones).

"Global Navigation Satellite System" and "GNSS" as used herein mean any system having a planet-orbiting satellite constellation that provides positioning, navigation, and timing (PNT) services. Examples of currently-existing GNSSs are the U.S. Global Positioning System (GPS), the Russian GLONASS system, the European Galileo system, the Chinese BeiDou system, the Indian IRNSS system, and the Japanese QZSS system.

"Global Positioning System" and "GPS" are used herein generically to mean any GNSS system, except where the context indicates that the terms refer specifically to the U.S. GPS system.

"GNSS device" and "GNSS-capable device" as used herein mean any device that is capable of receiving signals from one or more GNSS satellites and determining a location of the GNSS device using the received signals.

"Navigation message data" as used herein means data transmitted from satellites of a GNSS containing information for calculating a position of a GNSS device which receives the data. In current GNSS implementations, navigation message data comprises ephemeris parameters (allowing computation of the satellite's coordinates), time parameters and clock corrections (allowing computation of satellite clock offsets and time conversions), service parameters (containing information about the health of the satellite and the navigation data set used), ionospheric parameters (needed by single frequency receivers), and almanacs (allowing rough computation of the position of other satellites in the constellation for purposes of signal acquisition).

"Ephemeris" as used herein refers to a set of data that describes the precise position, velocity, and clock information of a specific satellite at a particular point in time. Ephemeris data is crucial for accurately determining the user's position using signals received from GNSS satellites, such as GPS, GLONASS, Galileo, and BeiDou. The ephemeris provides information about the satellite's position in three-dimensional space (usually in Earth-centered Earth-fixed coordinates) and its velocity. This information is essential for calculating the satellite's position at any given time and predicting its future path. The ephemeris also includes the satellite's onboard atomic clock information, which includes details about its clock bias, clock drift rate, and other parameters. This clock information is necessary to account for the differences in time between the satellite's clock and the receiver's clock. The ephemeris specifies the time at which the satellite's signal was transmitted. This time is essential for accurately determining the signal travel time between the satellite and the receiver. The ephemeris often includes additional parameters that define the satellite's orbit, such as eccentricity, inclination, semimajor axis, and argument of perigee. These parameters help accurately describe the shape of the satellite's orbital path.

DETAILED DESCRIPTIONS OF THE DRAWING FIGURES

FIG. 1 is a block diagram illustrating an exemplary system architecture for a GNSS accuracy improvement system. In this example, a network of GNSS devices 110, 120 provides positioning information to a GNSS location correction engine 200. The positioning information comprises one or more of the following types of information: navigation message data received by the device from GNSS satellites, calculated locations of the device from the navigation message data, positioning corrections calculated on the device, positioning corrections received from a source other than the device (e.g., the Internet), and/or other sensor data from the GNSS device such as acceleration, orientation, and direction information from on-board inertial measurement units (IMU) comprising one or more of accelerometers, gyroscopes, and/or magnetometers. Positioning information from the devices in the network 110, 120, or a selected subset of devices in the network, is sent to GNSS location correction engine 200 and stored as current and prior location estimates for the devices in the network 110, 120. GNSS location correction engine 200 estimates positional accuracy errors using an ensemble computational model which selects a subset of the device signals for computation based on similarity characteristics of the subset with a first device 110 of the network 110, 120, generates location correction data based on a multi-receiver positioning correction, and sends the location correction data to the first device 110 for correction of its on-board calculations of its location based on the satellite signals it has received. The methodology for correction is shown as being applied to the first device 110 for illustrative purposes, but this illustration is not intended to be limiting, and the same methodology may be applied to any GNSS device in the network of devices 110, 120. Further, the term "network" of GNSS devices is used broadly to describe any set of GNSS devices configured to share positioning information either with each other or with a cloud-based service for purposes of implementing the positional correction methodology described herein. There is no requirement that devices within the network act identically to one another. For example, some devices may be configured to provide positioning information only, others may be configured to receive correction data only, and still others may be configured to both provide positioning data and receive correction data.

The methodology described herein allows for correction of location information on GNSS devices with positional accuracy of less than a meter without requiring communication with fixed reference points (i.e., base stations), allowing consumer-grade GNSS devices to provide positional accuracy on par with that of commercial-grade GNSS devices, and potentially allowing future commercial-grade GNSS devices to be designed and built at a lower cost with the same or better positional accuracy. As will be discussed below, this conceptual architecture may be implemented in any number of configurations with GNSS location correction engine being located on the devices in the network 110, 120, on a cloud-based service or services, or a combination of the two, depending on factors such as device capabilities, positional accuracy requirements, network availability, bandwidth constraints, and load balancing considerations.

Figure 2:
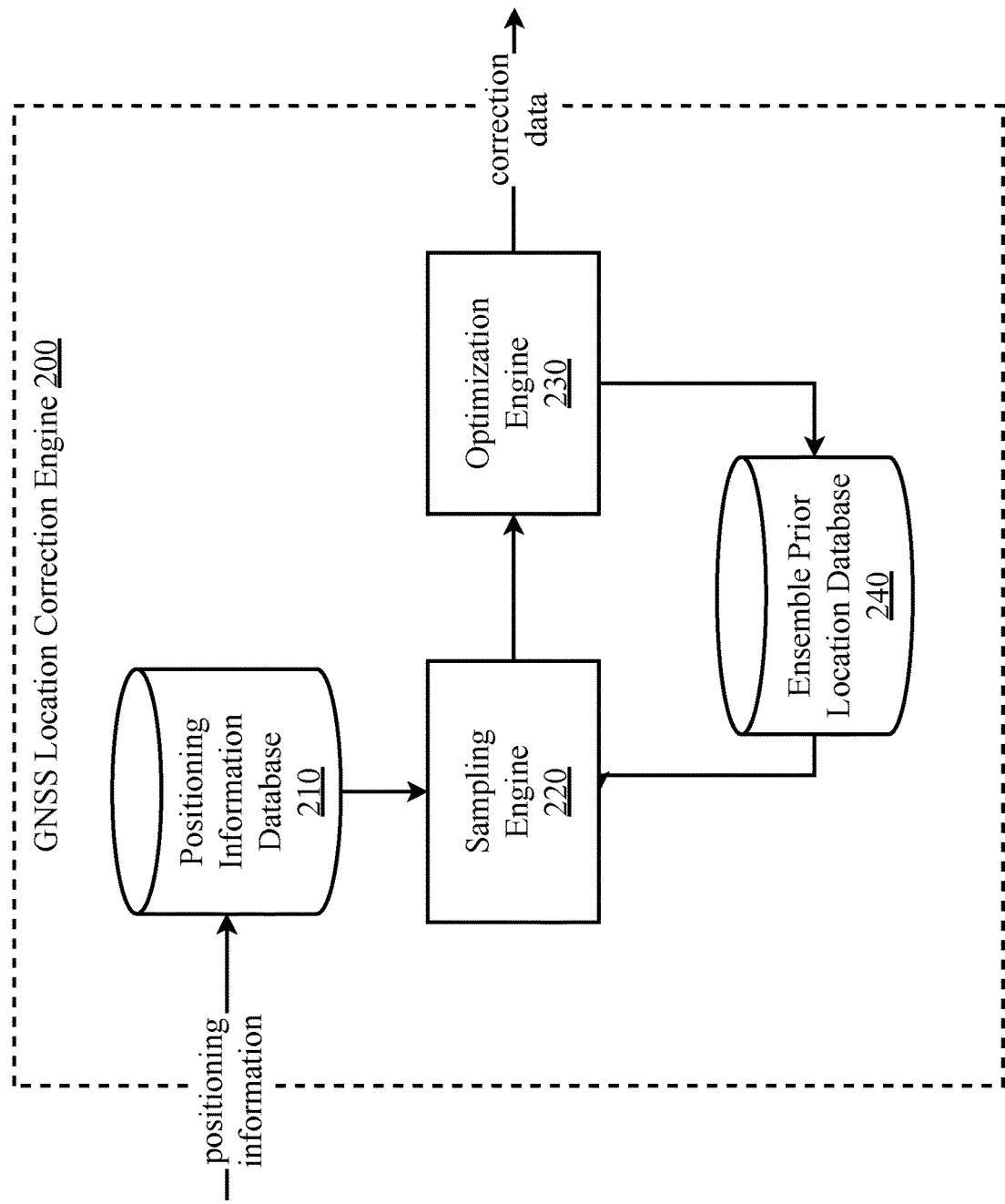
FIG. 2 is a block diagram illustrating an exemplary GNSS location correction engine aspect of a GNSS accuracy improvement system.

FIG. 2 is a block diagram illustrating an exemplary GNSS location correction engine aspect of a GNSS accuracy improvement system. In this example, GNSS location correction engine 200 comprises a positioning information database 210, a sampling engine 220, an optimization engine 230, and an ensemble prior location database 240.

Positioning information database 210 receives and stores positioning information from devices in the network of GNSS devices 110, 120.

Sampling engine 220 selects a subset of the device signals for computation based on similarity characteristics of the subset with a first device 110 of the network 110, 120. While non-device-specific sources of error (e.g., errors associated with ephemeris, clocks and timing, satellite health, ionospheric corrections, and satellite constellation changes) are corrected at the GNSS system level, device-specific sources of error are often a larger source of error and are more difficult to correct for. Device-specific sources of error are due to the location, design, or orientation of the GNSS device, and include such things as multi-path errors, antenna calibration errors (e.g., phase center offsets), antenna orientation errors, non-GNSS hardware interference errors, and carrier-phase cycle slips. Device-specific sources of error are typically addressed by on-device calculations and corrections (e.g., multi-path filtering, carrier-phase cycle slip detection, etc.), and are significantly greater for consumer-grade GNSS devices because of the design constraints discussed above.

Fortunately, both device-specific and non-device-specific sources of error are highly correlated across devices, either due to spatial proximity, or device type/composition, creating opportunities for correction other than the traditional methods of external reference stations and on-device corrections. More specifically, error corrections known or calculated for one GNSS device can be applied to another GNSS device with similar characteristics such as geographical proximity, device type, operating system, antenna type, GNSS chipset, device orientation, device movement, etc. Moreover, the error corrections known or calculated for individual devices can be combined into larger collective optimization problems that solve for the location of groups of devices, along with universal, device specific, location-specific, and satellite specific errors/calibrations/correlations.

Sampling engine 220 correlates characteristics of a target GNSS device 110 for which location corrections are needed with characteristics of other GNSS devices 120 in the network to determine which of other GNSS devices 120 would be most predictive of the corrections needed to provide accurate positioning of target GNSS device 110. A number of correlation algorithms may be used. As an example, a simple correlation algorithm would select a subset of other GNSS devices 120 having the greatest number of common characteristics with target GNSS device 110 such as geographical proximity, device type, operating system, antenna type, GNSS chipset, device orientation, and device movement. As another example, a more sophisticated algorithm would involve use of machine learning algorithms to select a subset of other GNSS devices 120 which have non-obvious or hidden correlations that prove to be predictive of location accuracy such as speed of movement (e.g., walking speed versus driving speed), device accelerations/decelerations, distances from and signal strength to/from cellular towers, timing and duration of WiFi and Bluetooth transmissions from the device, and similar operational and usage characteristics. Regardless of the algorithm used, the purpose of sampling engine 220 is to select a subset of other GNSS devices 120 in the network which most accurately reflect the corrections that need to be made to target GNSS device 110.

Optimization engine 230 generates the corrections for target GNSS device 110 using the positioning information from the subset of devices selected by sampling engine 220 by applying known or calculated error corrections from each of the subset of devices to first device 110. A number of algorithms may be used. As an example, a simple optimization algorithm would calculate an average error correction across the subset of devices for application to first device 110, which is known to have similar characteristics to the subset by virtue of the subset selection. Another simple optimization algorithm would calculate a weighted error correction across the subset of devices for application to first device 110, wherein certain characteristics of the devices in the subset (e.g., antenna type) are weighted more heavily than others. These simple corrections could be applied by an on-device GNSS location correction engine without the need for centralized processing as might be available via a cloud-based service. In another example, a more sophisticated algorithm would involve solving a multi-receiver positioning problem using positioning information from a plurality of GNSS devices, more detailed information for which is set forth in FIG. 9 and its associated descriptions. In some embodiments, optimization engine may incorporate prior location information from one or more of the subset of GNSS devices which has been previously stored in an ensemble prior location database 240. As described elsewhere herein, in some embodiments, the algorithms used by optimization engine 230 may incorporate inertial measurement unit (IMU) data and other non-GNSS data in determining positional corrections.

Regardless of the particular optimization algorithm used, the result is a system that allows for GNSS corrections for a given device that is not reliant on reference stations (although use of reference stations can be used in some embodiments), and which generates GNSS location corrections from a plurality of other GNSS devices. Optimization using positioning information from a sufficient number of GNSS devices allows for error corrections without external reference stations that provide a positional accuracy greater than could be achieved by attempting to calculate corrections based on a data from a single device. This allows use of a network of consumer-grade GNSS devices to provide positional accuracy greater than any single device of the network would be able to achieve.

Figure 3:
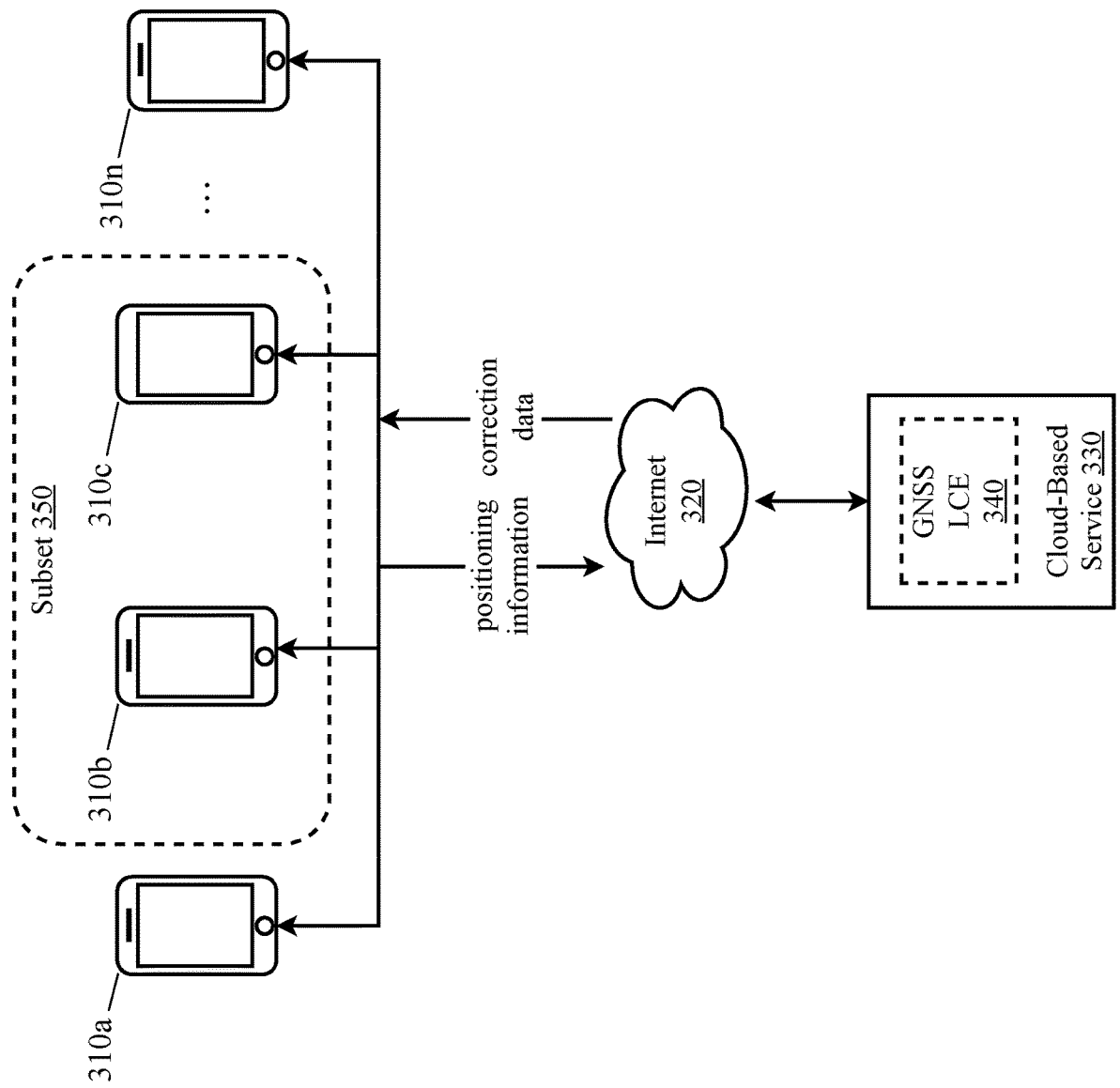
FIG. 3 is a block diagram illustrating an exemplary cloud service network implementation of a GNSS accuracy improvement system.

FIG. 3 is a block diagram illustrating an exemplary cloud service network implementation of a GNSS accuracy improvement system. In this exemplary implementation, GNSS location correction engine 340 is located on a cloud-based service 330, accessible via the Internet 320 by each GNSS device 310*a-n* of in the network. Each device may be configured to send its positioning information to GNSS location correction engine 340 via Internet 320, and receives correction data from GNSS location correction engine 340 via Internet 320. Connections of each device to Internet 320 may be of any appropriate type (e.g., WiFi, cellular data, etc.). Establishment of the network of GNSS devices may be accomplished by installing applications, operating system functionality, or firmware on each device configured to communicate with cloud-based service 330. Subsets 350 of devices (e.g., 310*b, c*) may be selected based on similar characteristics such as geographical proximity, device type, operating system, antenna type, GNSS chipset, device orientation, device movement, etc., as described above. Cloud-based service implementations are advantageous in certain situations such as where on-device GNSS location correction engines are impractical or unavailable (e.g., due to insufficient processing power on mobile GNSS devices to solve complex multi-receiver positioning problems) or where it is preferred that a large number of the GNSS devices 310*a-n* in the network act as sensors by providing positional information only (or even raw GNSS message data only).

Figure 4:
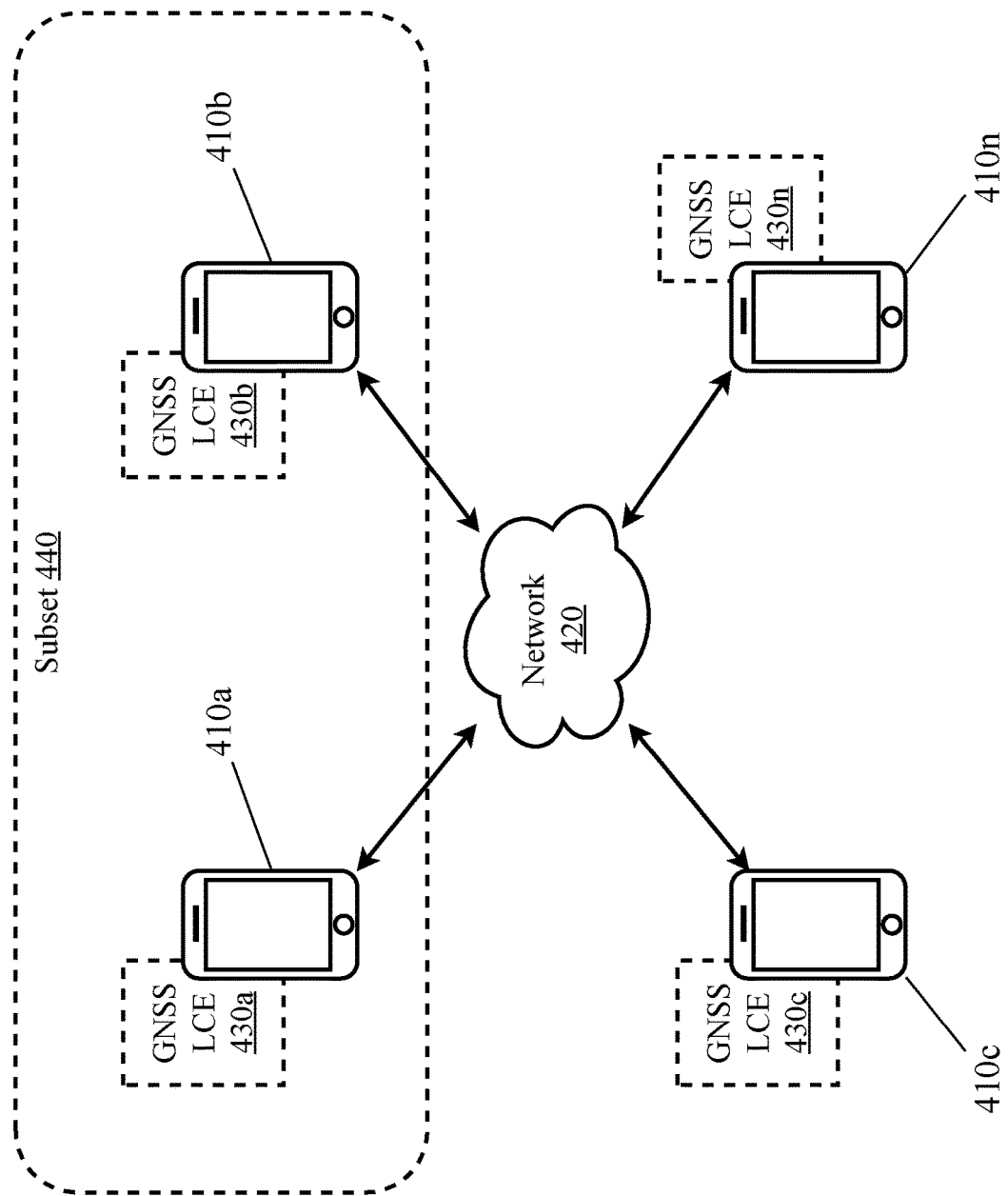
FIG. 4 is a block diagram illustrating an exemplary decentralized, peer-to-peer network implementation of a GNSS accuracy improvement system.

FIG. 4 is a block diagram illustrating an exemplary decentralized, peer-to-peer network implementation of a GNSS accuracy improvement system. In this exemplary implementation, a GNSS location correction engine (GNSS LCE) 430*a-n* is located on each GNSS device 410*a-n* of a network of GNSS devices. Each device is accessible to each other device via a network 420 which may be of any type appropriate to the implementation (e.g., local area network (LAN), wide area network (WAN), Internet-based). Each device may be configured to send its positioning information to other devices in the network via network 420, which may be to all devices 410*a-n* or a subset 440 of devices 410*a, b*. Each device may be configured to perform its own on-device error calculations based on the positioning information received from other devices (as well as its own positioning information), and may be configured to send out correction data to other devices via network 420, which may be to all devices 410*a-n* or a subset 440 of devices 410*a, b*. Error corrections received by each device may be incorporated into that device's next on-device calculations along with positioning information. In this manner, positional accuracy of each device in the network (or subset) is improved through iterative improvements in error corrections across the devices 410*a-n* (or subset 440 of devices 410*a, b*). Connections of each device to network 420 may be of any appropriate type (e.g., Bluetooth, WiFi, cellular data, etc.). Establishment of the network of GNSS devices may be accomplished by installing applications, operating system functionality, or firmware on each device configured to communicate with other devices via network 420. Subsets 440 of devices (e.g., 410*a, b*) may be selected based on similar characteristics such as geographical proximity, device type, operating system, antenna type, GNSS chipset, device orientation, device movement, etc., as described above. Peer-to-peer implementations are advantageous in certain situations such as when devices may not be connected to the Internet for security reasons (e.g., certain military applications), when network connections are intermittent or bandwidth is limited and on-device processing of error corrections is preferable (e.g., work in remote locations), or where decentralization is preferred to eliminate reliance on a centrally-controlled system or to provide network resilience through redundancy.

Figure 5:
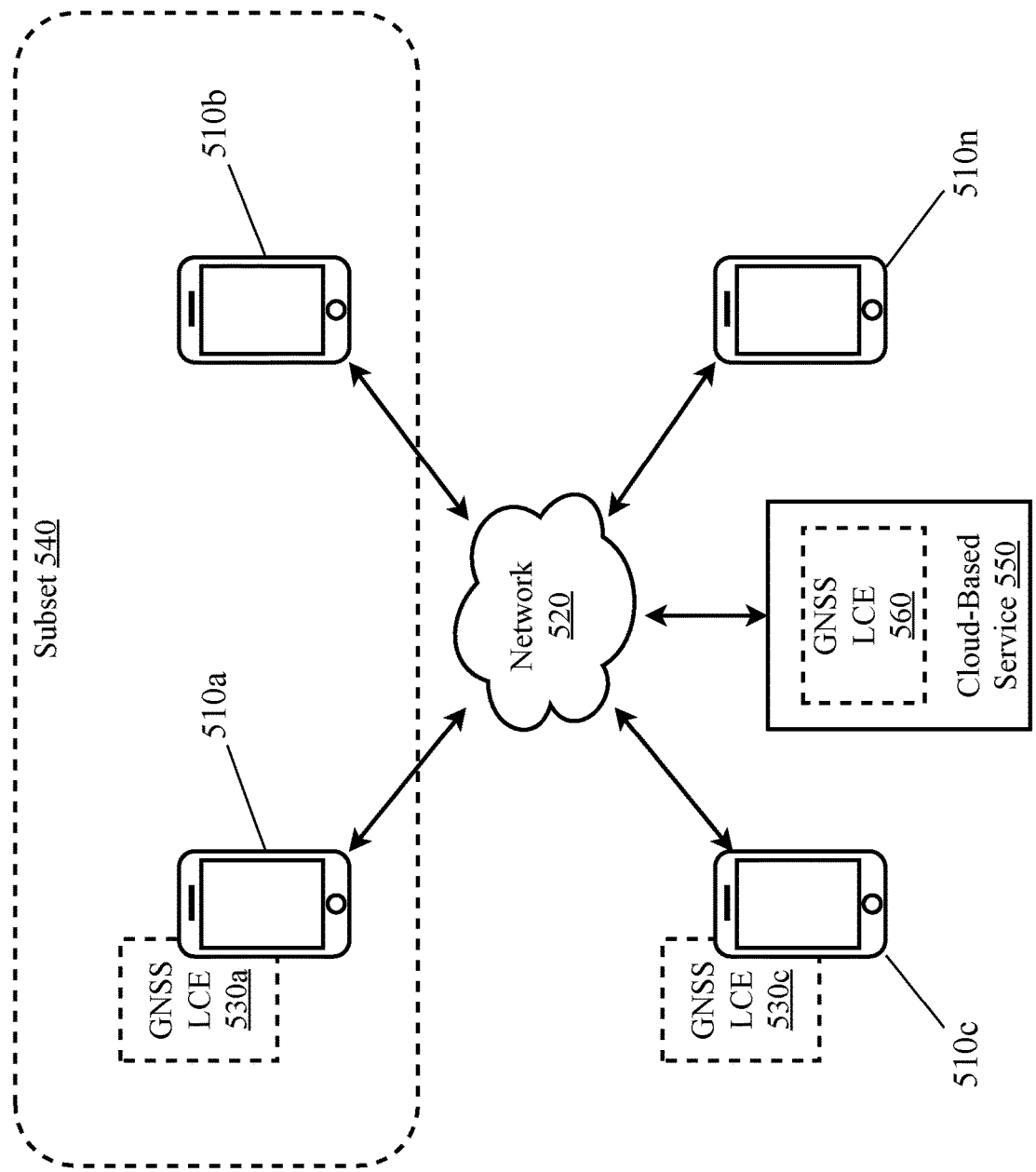
FIG. 5 is a block diagram illustrating an exemplary hybrid network implementation of a GNSS accuracy improvement system.

FIG. 5 is a block diagram illustrating an exemplary hybrid network implementation of a GNSS accuracy improvement system. In this exemplary implementation, GNSS location correction engines (GNSS LCEs) 530*a, c* are located on some GNSS devices 510*a, c* and on a cloud-based service 550. Some devices 510*b, n* do not have an on-device GNSS location correction engine. Some or all of the devices 510*a-n* are accessible to one another via a network 520 which may be of any type appropriate to the implementation (e.g., local area network (LAN), wide area network (WAN), Internet-based). Each device may be configured to send its positioning information to other devices via network 520, which may be to all devices 510*a-n* or a subset 540 of devices 510*a, b*. Each device having an on-device GNSS LCE 510*a, c* may be configured to perform its own on-device error calculations based on the positioning information received from other devices (as well as its own positioning information), and may be configured to send out correction data to other devices via network 520, which may be to all devices 510*a-n* or a subset 540 of devices 510*a, b*. Error corrections received by each device may be incorporated into that device's next on-device calculations along with positioning information. In this manner, positional accuracy of each device in the network (or subset) is improved through iterative improvements in error corrections across the devices 510*a-n* (or subset 540 of devices 510*a, b*). Connections of each device to network 520 may be of any appropriate type (e.g., Bluetooth, WiFi, cellular data, etc.). Establishment of the network of GNSS devices may be accomplished by installing applications, operating system functionality, or firmware on each device configured to communicate with other devices via network 420. Subsets 440 of devices (e.g., 410*a, b*) may be selected based on similar characteristics such as geographical proximity, device type, operating system, antenna type, GNSS chipset, device orientation, device movement, etc., as described above. Further, in this hybrid implementation, some devices, particularly those not having on-device GNSS LCEs (e.g., 510*b, n*) may be configured to receive correction data from GNSS LCE 560 on a cloud-based service 550, in which case network 520 further comprises access to the Internet to facilitate access to cloud-based service 550.

Hybrid implementations are advantageous in certain situations such as where some devices have on-device GNSS LCEs and others do not (e.g., where there is a substantial disparity in on-device processing power), where a portion of the location correction calculations are better offloaded to more powerful cloud-based processing (e.g., for solving complex algorithms involving positions of multiple receivers over time), and for battery usage optimization (e.g., where battery power draw to communicate with cloud-based service 550 is less than battery power draw to perform GNSS LCE processing).

Figure 6:
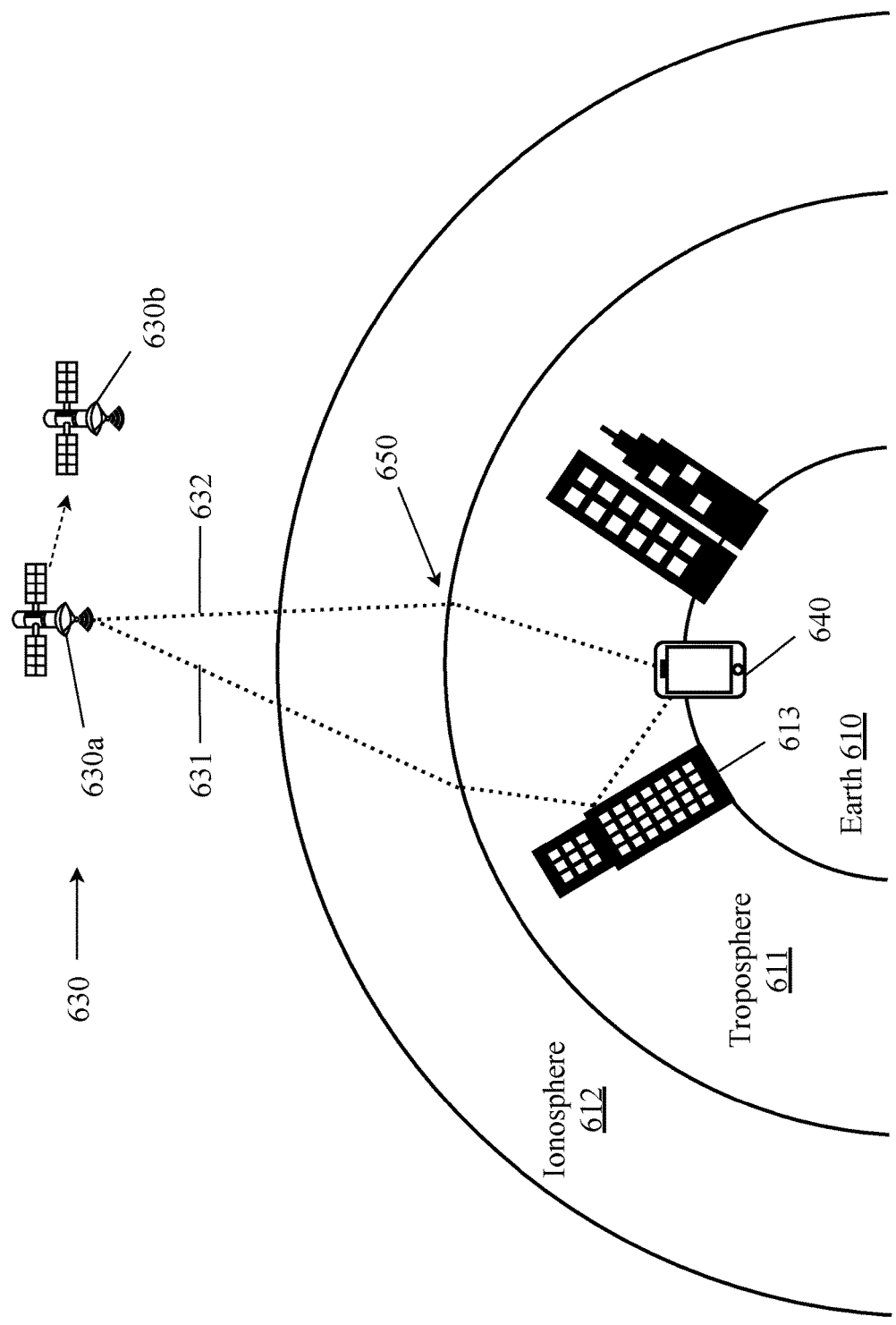
FIG. 6 (PRIOR ART) is a diagram illustrating some of the sources of error in GNSS location accuracy.

FIG. 6 (PRIOR ART) is a diagram illustrating some of the sources of error in GNSS location accuracy. Here, a GNSS satellite 630 is shown transmitting signals to the GNSS device 640. One source of error is clock error, which can cause satellite 630 to appear to GNSS device 640 to be at an inaccurate location 630*b* instead of at its true location 630*a*. Clock errors can cause positional accuracy errors at a GNSS device on the order of 1 to 3 meters. Another source of error are atmospheric errors, and particularly changes in the ionosphere 612, the upper layer of the Earth's 610 atmosphere that is ionized by radiation from the sun. Changes in ionization occur in day/night cycles, seasonal cycles, and with changes in solar activity (e.g., solar flares). Ionization delays the propagation of satellite signals, causing timing inaccuracies and refraction at the boundary 650 between the ionosphere 612 and the troposphere 611 of the Earth 610, also causing satellite 630 to appear to GNSS device 640 to be at an inaccurate location 630*b* instead of at its true location 630*a*. Atmospheric errors can cause positional accuracy errors at a GNSS device on the order of 5 to 10 meters. Atmospheric errors can be nearly eliminated by using dual frequency satellite signals, but this feature is not yet fully implemented on all GNSS systems and relatively few consumer-grade GNSS devices have dual-frequency capability. Both of these non-device-specific types of errors are monitored from ground stations of the GNSS, and corrections are transmitted to the GNSS satellites for inclusion in the navigation message data they transmit to GNSS devices. However, the corrections sent by the ground stations are periodic, so there is still room for improved correction based on the ensemble correction methodologies described herein.

Another significant source of error is the device-specific (or more specifically, location-specific) problem of multi-path signal errors. This problem occurs due to reflections of satellite signals from hard surfaces such as buildings. Here, for example, GNSS device 640 receives a signal directly 632 from satellite 630, but also receives the same signal as a reflection 631 from a tall building 613 having a longer transmission path. As the timestamp of the received signal is the same. GNSS device may not be able to distinguish whether directly-received signal 632 or reflected signal 631 is the proper signal. Multi-path errors can cause positional accuracy errors at a GNSS device on the order of 1 to 3 meters.

Figure 7:
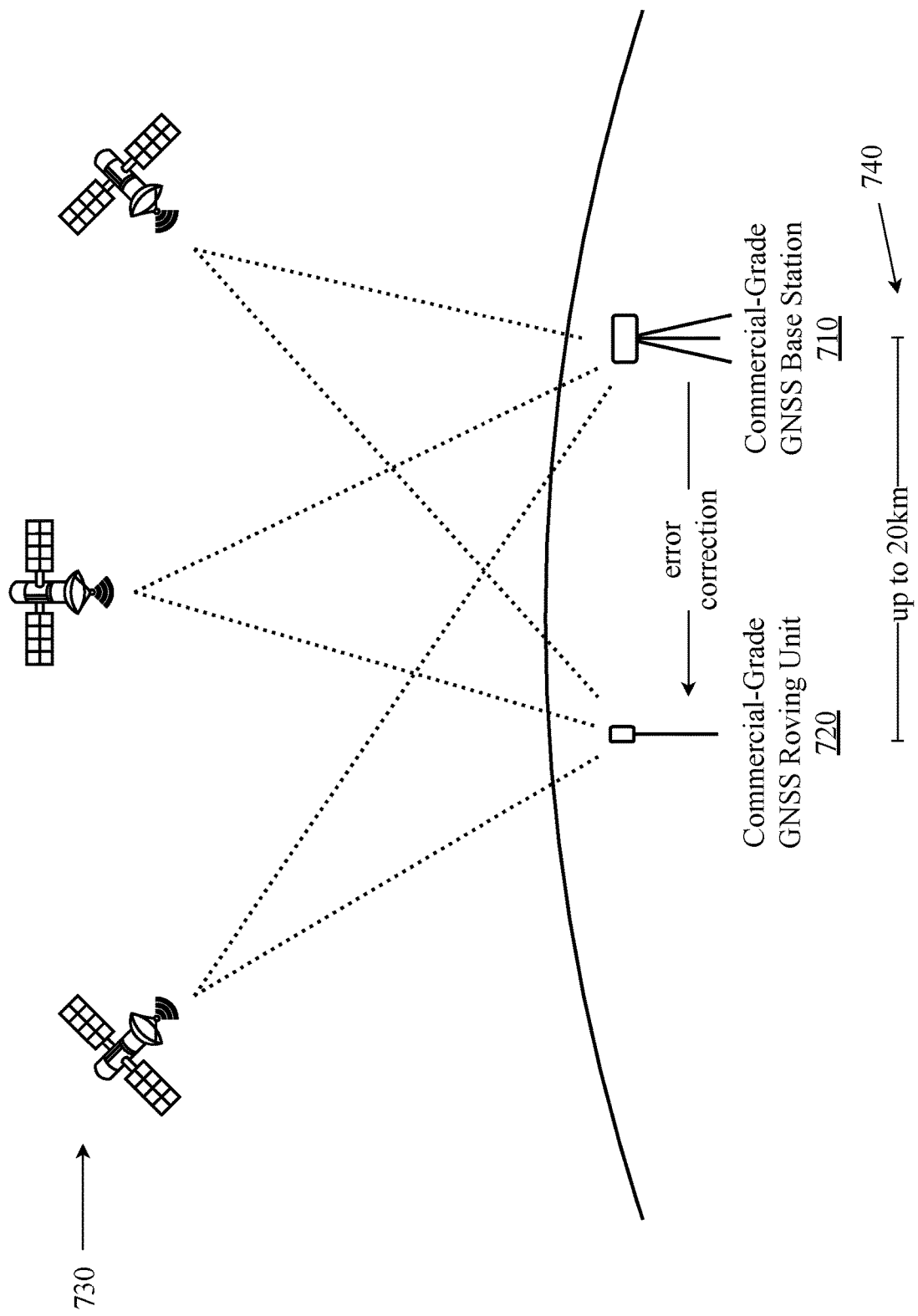
FIG. 7 (PRIOR ART) is a diagram illustrating correction of sources of error in GNSS location accuracy using a base station with commercial-grade GNSS surveying equipment.

FIG. 7 (PRIOR ART) is a diagram illustrating correction of sources of error in GNSS location accuracy using a base station with commercial-grade GNSS surveying equipment. Commercial-grade GNSS surveying equipment corrects for the positioning accuracy errors described above through use of a fixed base station 710 which remains in place throughout a given surveying project combined with a movable roving unit 720. Both fixed base station 710 and roving unit 720 are purpose-built GNSS devices with dedicated GNSS antennas and other hardware designed to maximize positional accuracy from signals from GNSS satellites 730. The inherent accuracy of both devices 710, 720 combined with the fixed location of base station 710 allows base station 720 to calculate and transmit correction data (typically at UHF 400-475 MHz or VHF 170-220 MHZ frequencies) to roving unit 720 with sufficient accuracy to provide positional accuracy at roving unit 720 of 1 cm to 5 cm. While this approach provides tremendous accuracy, it has several disadvantages. First, this approach requires a fixed base station with GNSS capabilities located within about 20 km 740 of the mobile GNSS device. Second, it requires direct communication between the fixed base station and the mobile GNSS device. Third, there is considerable interference at the frequencies used (allocated by the Federal Communications Commission (FCC) in the U.S. for this purpose) where multiple base stations are located in the same area. These disadvantages make this approach to improving GNSS positional accuracy unsuitable for wide-spread consumer use where the vast majority of devices are consumer-grade GNSS devices (and primarily mobile phones).

Figure 8:
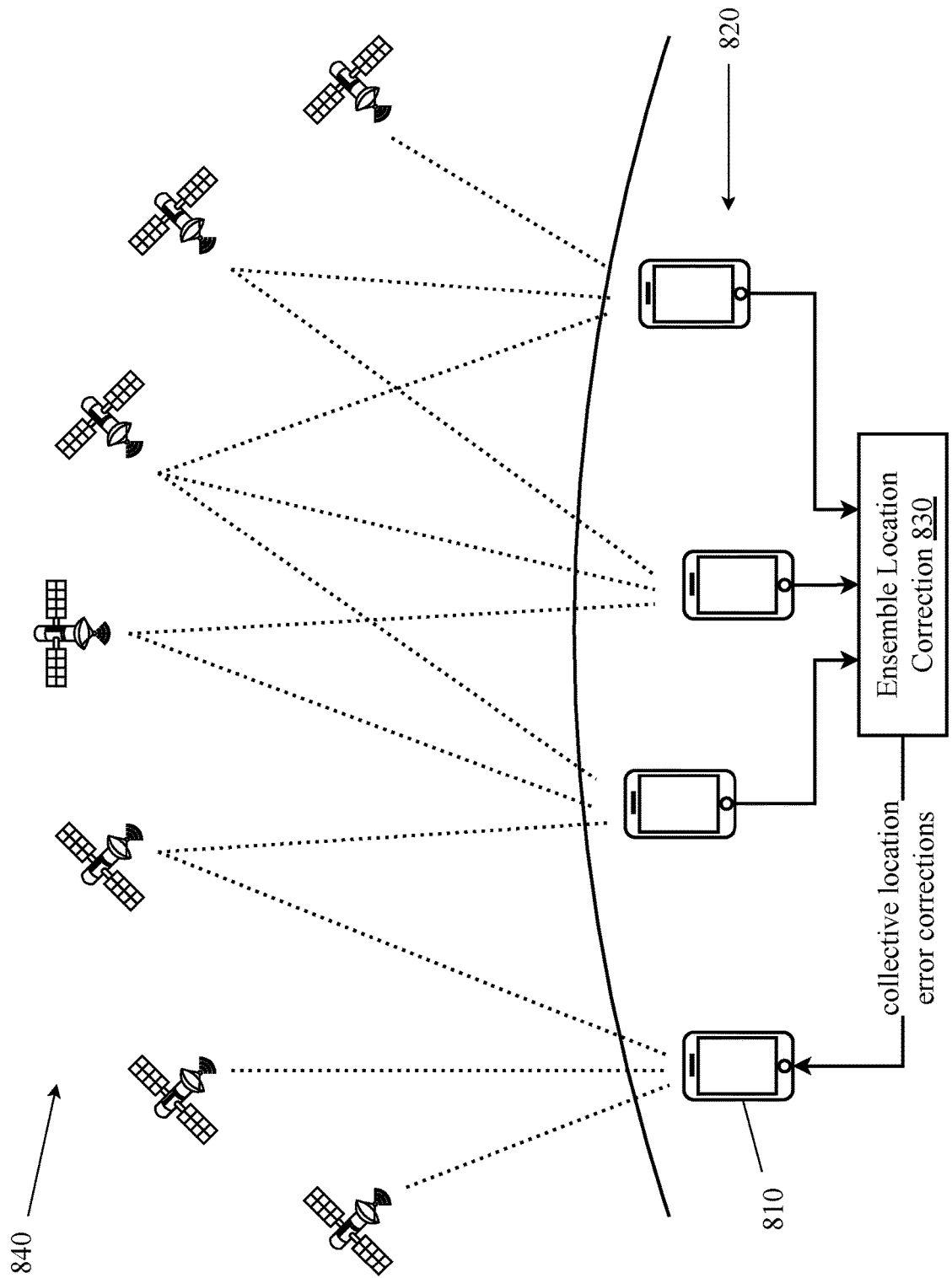
FIG. 8 is a diagram illustrating correction of sources of error in GNSS location accuracy using consumer-grade GNSS devices.

FIG. 8 is a diagram illustrating correction of sources of error in GNSS location accuracy using consumer-grade GNSS devices. In this approach, a network of consumer-grade GNSS devices 810, 820 are used to collect and provide positional information (navigational message data and/or other positional information) in a given geographical area based on their individual receipt of signals from GNSS satellites 840 (which do not necessarily have to be from the same GNSS system). The positional information from each individual GNSS device 810, 820 is combined into an ensemble location correction 830 and collective location error corrections are sent to one or more GNSS devices 810 of the network to improve the positional accuracy of the one or more GNSS devices 810. This methodology has advantages over existing GNSS correction methods in that it does not require the use of a base station, does not require direct communication with a base station or other device, is not subject to communication interference with other devices using the same technology, and does not require any purpose-built or commercial-grade GNSS devices (i.e., the methodology can be used to improve positional accuracy of consumer-grade GNSS devices using other consumer-grade GNSS devices, with none of them having specialized hardware).

Figure 9:
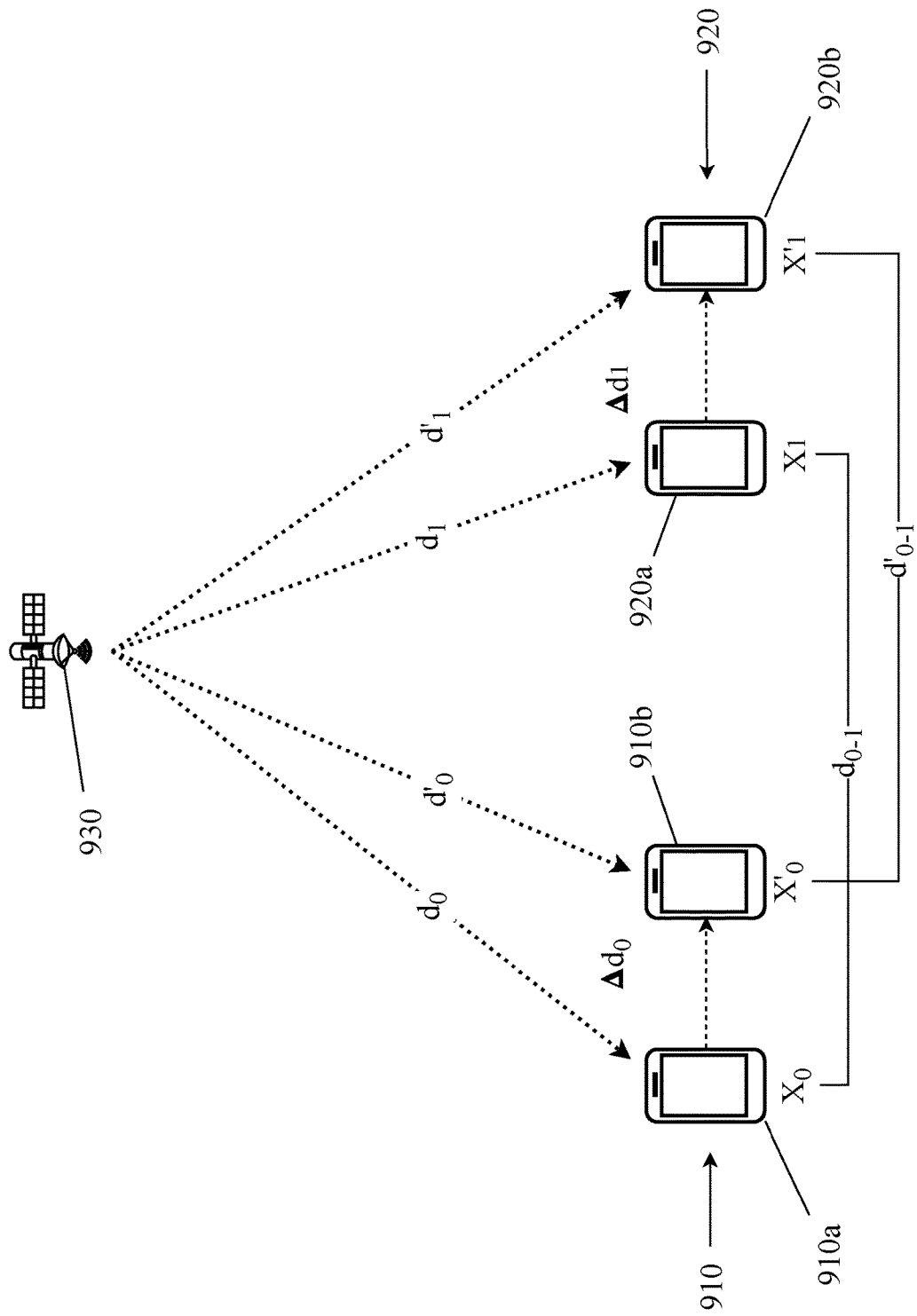
FIG. 9 is a diagram illustrating an exemplary algorithm for GNSS location correction based on positional information of two consumer-grade mobile GNSS devices over a period of time.

FIG. 9 is a diagram illustrating an exemplary algorithm for GNSS location correction based on positional information of two consumer-grade mobile GNSS devices over a period of time. This exemplary algorithm is a decomposition of a multi-receiver collective optimization problem into a simpler problem wherein the location of two GNSS devices 910, 920 are determined through shared positional information for two time periods.

Here, $X_0$ 910a is the location of a first GNSS device 910 at time $t_0$. $X'_0$ 910b is the location of first GNSS device 910 at time $t_1$. $D_0$ is the satellite signal received by first GNSS device 910 from GNSS satellite 930 at time $t_0$. $D'_0$ is the satellite signal received by first GNSS device 910 from GNSS satellite 930 at time $t_1$. Ado is change in physical location of first GNSS device 910 from time $t_0$ to time $t_1$. $D_{0-1}$ is the distance (including direction) from first GNSS device 910 to a second GNSS device 920 at time to.

$X_1$ 920a is the location of a second GNSS device 920 at time $t_0$. $X'_1$ 920b is the location of second GNSS device 920 at time $t_1$. $D_1$ is the satellite signal received by second GNSS device 920 from GNSS satellite 930 at time $t_0$. $D'_1$ is the satellite signal received by second GNSS device 920 from GNSS satellite 930 at time $t_1$. $\Delta d_1$ is change in physical location of second GNSS device 920 from time $t_0$ to time $t_1$. $D'_{0-1}$ is the distance (including direction) from first GNSS device 910 to second GNSS device 920 at time to.

In this deconstructed example, assuming that $X_0$ 910a is known, the positional accuracy of $X'_1$ 920b can be substantially improved by solving an optimization problem involving the error corrections (atmospheric and clock/timing error corrections) contained in the navigation message data in signals $d_0$, $d'_0$, $d_1$, and $d'_1$ that solves for $d'_{0-1}$. The problem is non-linear because each calculated correction for each GNSS device affects the calculated correction for the other GNSS device, so the potential solutions increase exponentially as the number of devices increases. With only two GNSS devices, the solution is not difficult to calculate.

Extending this algorithm to the case where a large number of GNSS devices are providing data, assuming that $X_0$ is known, the positional accuracy of second GNSS device 920 at $X_1$ 920a can be corrected to centimeter-level accuracy using the same technique, but applied to the large number of GNSS devices. Here, the error corrections contained in the navigation message data of all GNSS devices are incorporated into an optimization problem which, when solved, converges on the true value of $d_{0-1}$ without knowing the receiver positions of any of the GNSS devices other than first GNSS device 910 at $X_0$. This is a full non-linear optimization problem that incorporates common and correlated parameters across devices wherein each calculated solution for each GNSS device affects the calculated solutions for each other GNSS device. The solution to this problem can be obtained by using computationally intensive optimizers such as Stochastic Gradient Descent (SGD) variants (for example Adam) and Trust-region/line-search non-linear solvers (for example Ceres, and Interior Point OPTimizer (IPOPT)). When this algorithm is implemented as a persistent external service, the system can continuously maintain correction states across the collection of devices, thereby keeping the initial convergence time small.

More generally, the optimization problem is a triangulation problem which will have several terms of the form: (x_satellite−x_receiver)^2+(y_satellite−y_receiver)^2+(z_satellite−z_receiver)^2−distance^2+ . . . . So, while minimization of this triangulation problem is technically a non-linear computation, in its simplest form it is a linear least squares problem and could, in practice, be solved converting it to a linear matrix equation and solving that equation. Additional non-linearity is added to the optimization problem when corrections having more complicated derivatives are added to the distances, which makes the optimization problem more difficult to solve. However, approaches to solving this optimization problem include, but are not limited to algorithms which iterate over linearized versions of the non-linear objective of the problem such as gradient descent, Gauss-Newton, and Levenberg-Marquart algorithms. Thus, the optimization problem can be solved using either linear or non-linear algorithms.

Thus, unlike traditional error correction solutions which solve for a single GNSS device, the methodology described herein solves for the error inherent in a GNSS based location solution using metadata on ephemeris, ionosphere, troposphere, satellite clock, multi-path error, and antenna calibration error, while being resilient to carrier-phase cycle slip.

Figure 10:
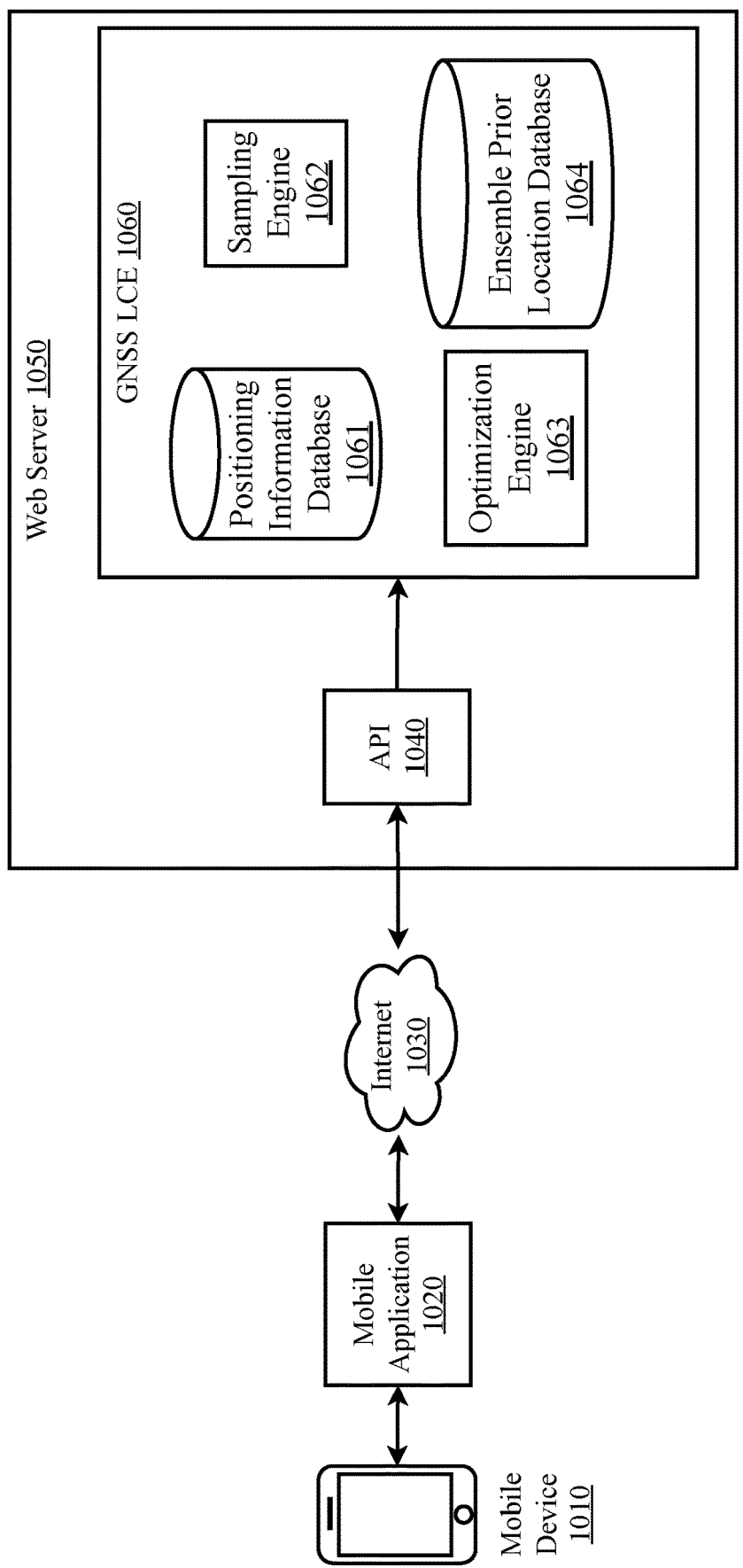
FIG. 10 is a block diagram illustrating an exemplary system architecture for an online platform for a GNSS accuracy improvement system.

FIG. 10 is a block diagram illustrating an exemplary system architecture for an online platform for a GNSS accuracy improvement system. The online platform of this embodiment comprises a mobile application 1020 running on one or more mobile devices 1010, an application programming interface (API) 1040, a webserver 1050, and a global navigation satellite system location correction engine (GNSS LCE) 1060 operating on a web server. While this simplified diagram shows a single instance of each component of the online platform for purposes of clarity, there may be a plurality of instances of each such component. The plurality of instances of each component need not be identical to other instances, and may be configured to operate with certain devices (e.g., there may be different versions of mobile application 1020 operating on different devices such as iOS® or Android® devices) or may have different functionality (e.g., there may be multiple APIs 1040, each providing different functionality related to GNSS LCE 1060).

Mobile application 1020 is installed on, and operating on, one or more mobile devices 1010 having GNSS capability. Mobile application 1020 is configured to access APIs 1040 via Internet 1030, each API 1040 operating on web server 1050 and being a software interface for interactions between mobile application 1020 and GNSS LCE 1060 such as exchange of data, changing of configurations, etc. In this diagram. GNSS LCE 1060 is shown as being located on the same web server 1050 as API 1040, but GNSS LCE 1060 may be located on a different server or servers, whether dedicated hardware servers or virtual servers, according to standard networking techniques.

GNSS LCE 1060 comprises a positioning information database 1061, a sampling engine 1062, an optimization engine 1063, and an ensemble prior location database 1064, each having functionality as described for their counterparts 210, 220, 230, 240 in FIG. 2.

Figure 11:
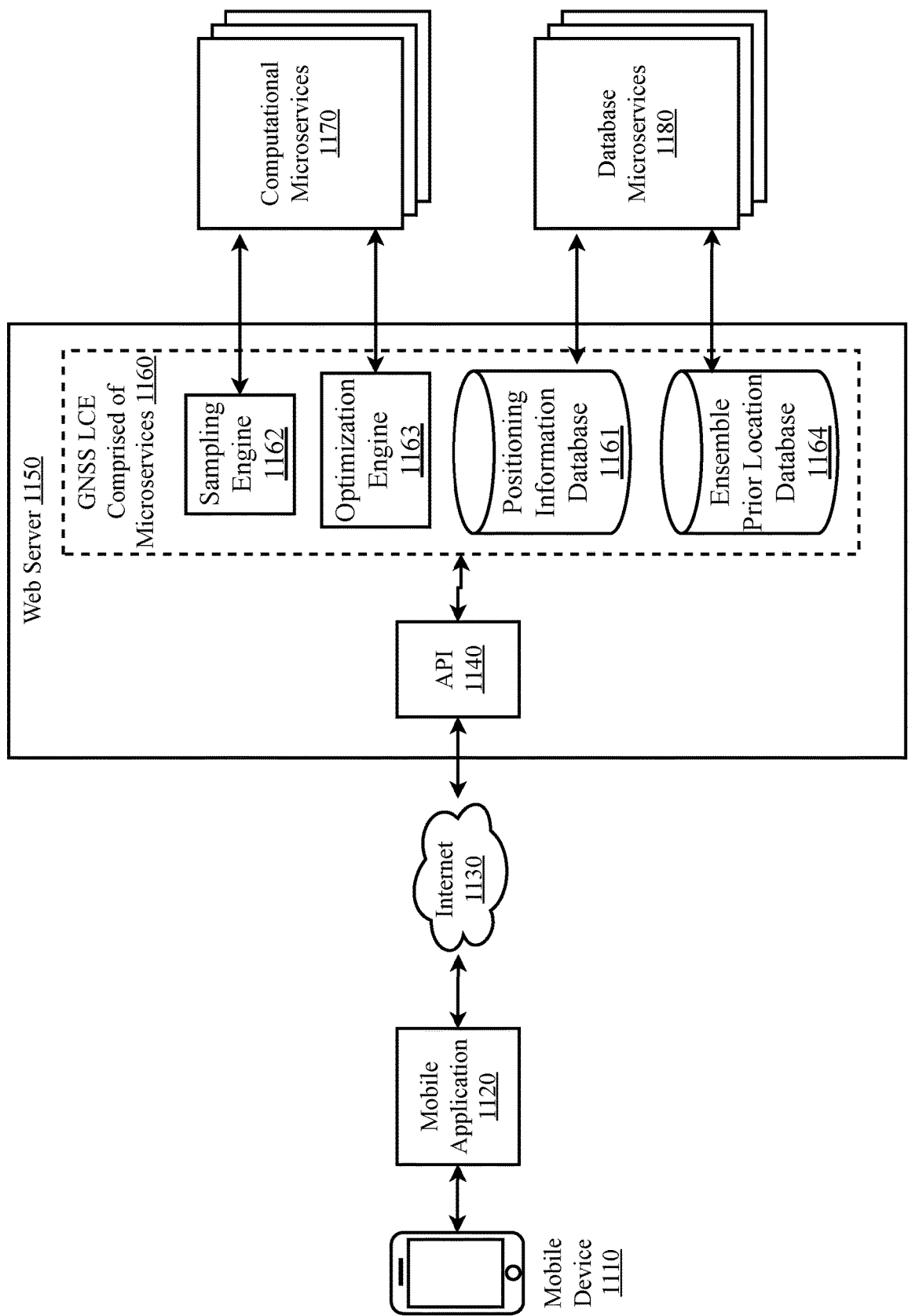
FIG. 11 is a block diagram illustrating another exemplary system architecture for an online platform for a GNSS accuracy improvement system using microservices.

FIG. 11 is a block diagram illustrating another exemplary system architecture for an online platform for a GNSS accuracy improvement system using online services and microservices. The online platform of this embodiment comprises a mobile application 1120 running on one or more mobile devices 1110, an application programming interface (API) 1140, a webserver 1150, and a global navigation satellite system location correction engine (GNSS LCE) 1160 comprised of microservices configured to provide the functionality of each component of GNSS LCE 1160. While this simplified diagram shows a single instance of each component of the online platform for purposes of clarity, there may be a plurality of instances of each such component. The plurality of instances of each component need not be identical to other instances, and may be configured to operate with certain devices (e.g., there may be different versions of mobile application 1120 operating on different devices such as iOS® or Android® devices) or may have different functionality (e.g., there may be multiple APIs 1140, each providing different functionality related to GNSS LCE 1160).

Mobile application 1120 is installed on, and operating on, one or more mobile devices 1110 having GNSS capability. Mobile application 1120 is configured to access APIs 1140 via Internet 1130, each API 1140 operating on web server 1150 and being a software interface for interactions between mobile application 1120 and GNSS LCE 1160 such as exchange of data, changing of configurations, etc. In this diagram. GNSS LCE 1160 is shown as being located on the same web server 1150 as API 1140, but GNSS LCE 1160 may be located on a different server or servers, whether dedicated hardware servers or virtual servers, according to standard networking techniques.

GNSS LCE 1160 comprises a positioning information database 1161, a sampling engine 1162, an optimization engine 1163, and an ensemble prior location database 1164, each having functionality as described for their counterparts 211, 220, 230, 240 in FIG. 2. In this embodiment, however, each of these components function, in whole or in part, by accessing one or more online services or microservices each of which provides certain functionality of the component such as searching, storing, analyzing, caching, and networking. For example, some or all of the functionality of the computational components (sampling engine 1162 and optimization engine 1163) may be provided by accessing one or more computational microservices 1170, computational database services 1180, data analytics services, or distributed computing services such as Apache Spark™, Hadoop®. Amazon EMR. Google BigQuery. Azure Cloud Services. Azure Synapse Analytics, and Azure HDInsight. Some or all of the functionality of the database components (positioning information database 1161 and ensemble prior location database 1164) may be provided by accessing one or more database services such as Amazon Web Services (AWS) Cloud Database. Mongo DB™, Google Cloud Databases, Redis™, and Azure Cosmos DB.

Figure 12:
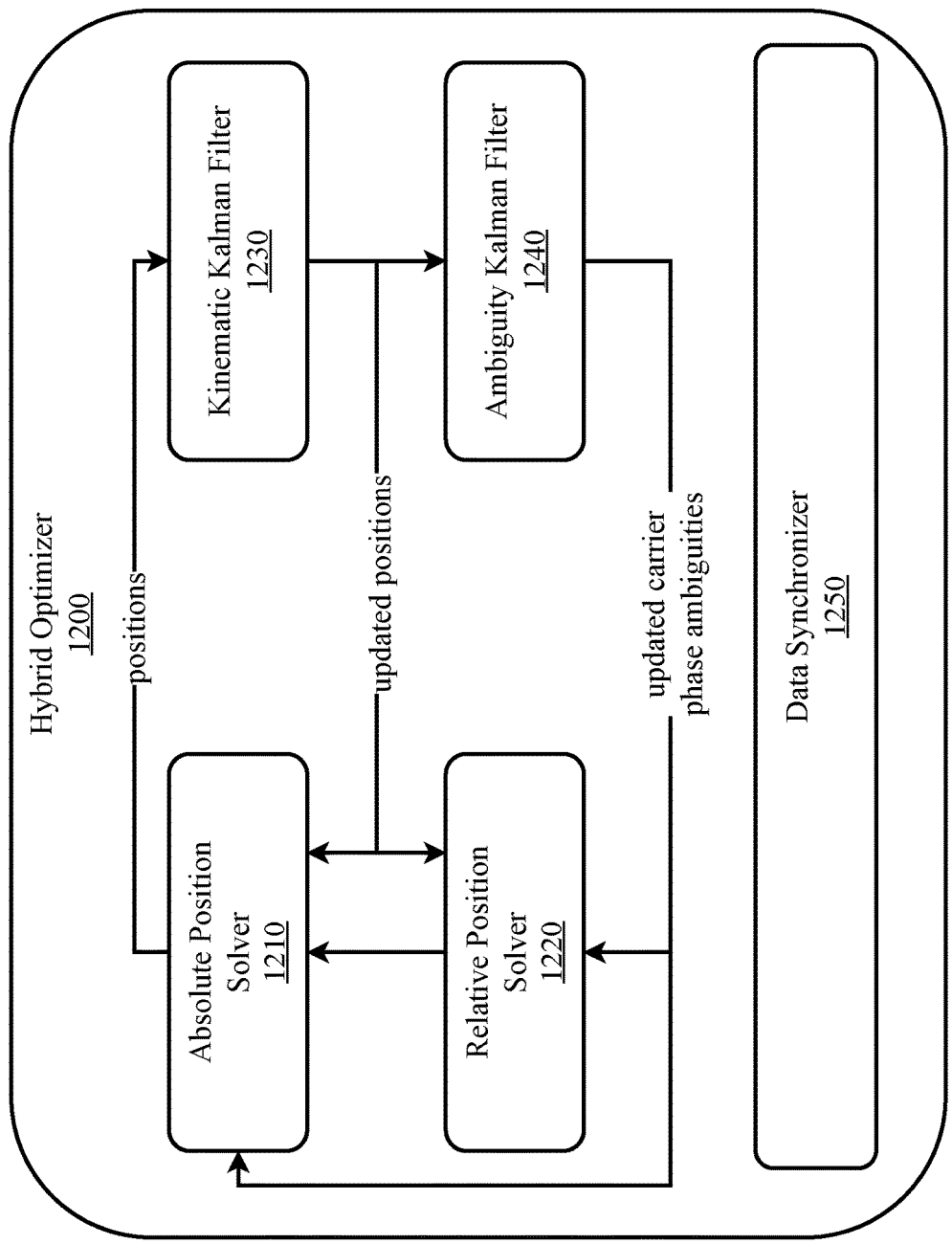
FIG. 12 is a block diagram illustrating an exemplary aspect of a GNSS location correction engine, a hybrid optimizer.

FIG. 12 is a block diagram illustrating an exemplary aspect of a GNSS location correction engine, a hybrid optimizer 1200. According to the embodiment, the hybrid optimizer may comprise an absolute position solver 1210 a relative position solver 1220, a kinematic Kalman (KK) filter 1230, and an ambiguity Kalman (AK) filter 1240. In operation, hybrid optimizer 1200 is configured to utilize data form multiple GNSS devices, treating the location correction and optimization process as a network of interconnected measurements. The measurements from each device are used collectively to optimize the relative positions of devices in pairs, leading to an overall improvement in the accuracy and precision of the positioning solution for all devices in the network. This can lead to more accurate and reliable positioning outcomes by leveraging the combined information from all devices in the network.

Hybrid optimizer 1200 may receive positioning information associated with a plurality of GNSS devices. A subset of devices may be analyzed by hybrid optimizer 1200. In an embodiment, the subset comprises a pair of GNSS devices. The positioning information may be acquired from, or may comprise, in part or in whole, satellite ephemeris. The positioning information may comprise pseudorange and phase carrier measurements.

Absolute position solver 1210 may be configured to provide high-precision positioning for a GNSS device utilizing a position technique. In an embodiment, absolute position solver 1210 may implement the precise point positioning technique. Relative position solver 1220 may be configured to provide high-precision positioning for a GNSS device utilizing a position technique. In an embodiment, relative position solver 1220 may implement the real-time kinematic technique. Hybrid optimizer 1200 leverages a dynamic interplay between PPP and RTK techniques in a networked GNSS context. In an embodiment, the PPP technique provides an initial anchor for refining positions through RTK optimizations, and the improved positions from RTK feed back into PPP, creating a continuous cycle of enhancement. In another embodiment, the RTK optimizations are computed from received GNSS positioning information which is used as an initial input into the PPP process. By starting the feedback cycle with the RTK optimization process before the PPP process, the system can take advantage of the ensemble nature of RTK analysis. This approach leverages the strengths of both techniques to rapidly improve the accuracy of GNSS positioning for all devices in the network.

In the context of networked GNSS, "massive pairwise optimization" refers to optimizing the positions of devices in pairs throughout the entire network. For each pair of devices, their relative positions are refined based on the measurements they receive from common satellites. This optimization process is performed for all possible pairs within the network, collectively contributing to higher accuracy across the board.

The optimization loop describes a continuous and iterative process where the outputs of each optimization stage contribute to enhancing subsequent stages. In this case, the improvements obtained from both absolute positing solver 1210 and relative position solver 1220 optimizations feed back into each other, creating a cycle of refinement. This leads to a cumulative effect where each iteration results in more accurate positioning. Precise point positioning is used as a starting "anchor position" for real-time kinematic optimizations. PPP provides a relatively accurate initial estimation of device positions based on the received GNSS signals. This anchor position serves as a reference point for refining positions through the RTK process. RTK pairwise optimizations involve iteratively refining the positions of devices in pairs using the anchor position provided by PPP. The measurements from common satellites received by both devices are used to improve the relative position estimate between them. This optimization process considers factors such as carrier phase measurements, atmospheric corrections, and clock errors to achieve centimeter-level accuracy. The improved positions obtained through RTK optimizations are fed back into the PPP calculation. This means that the refined positions from the RTK process contribute to enhancing the accuracy of the PPP technique. As the positions become more accurate through RTK, the PPP calculation becomes more precise due to the improved reference positions.

The feedback loop iterates rapidly, with each iteration leading to better positioning accuracy. The combination of PPP and RTK techniques, along with the continuous refinement through pairwise optimizations, accelerates the convergence of device positions to their true locations. This convergence happens more quickly compared to using either PPP or RTK alone.

According to an embodiment, kinematic Kalman filter 1230 may be configured to receive positioning information associated with a pair (or plurality of pairs) of GNSS devices and estimate updated positions for each device. The updated/estimated positions may be sent to both solvers 1210, 1220 and ambiguity Kalman filter 1240. At ambiguity Kalman filter 1240 the estimated position values for each device of the pair of devices is used to compute a double differenced carrier phase ambiguity measurements. These updated carrier phase measurements are then sent to both solvers 1210, 1220. Relative position solver 1220 receives the updated carrier phase measurements and estimated/updated positions, and uses them as an input for the RTK technique. The output of the RTK 1220 is a position value for each device of the pair of devices. Absolute position solver 1210 may receive the estimated/updated positions from kinematic Kalman filter 1230, the updated carrier phase ambiguity measurements from ambiguity Kalman filter 1240, and the computed position values from relative position solver 1220, and use these values as inputs for the PPP technique to determine an absolute position value for each device of the pair of devices. This process may repeat iteratively until it converges on a precise location (e.g., centimeter level precision).

A data synchronizer 1250 may be present and configured to combine and align carrier phase information with code pseudorange measurements. This alignment is intended to improve the accuracy of positioning information and is carried forward over time until specific conditions signal the need for reevaluation, such as the "loss of signal track" or the occurrence of an "unrecoverable cycle slip." In some implementations, GNSS LCE and/or one of its components such as data synchronizer 1250 may interact with an API which provides carrier phase information obtained from accumulated delta range (ADR) measurements. ADR is a measure of the accumulated carrier phase change over time. It's used to calculate the fractional part of the carrier phase cycle that has occurred since the receiver was turned on. ADR measurements provide more precise positioning information than code pseudorange measurements. Data synchronizer 1250 may align carrier phase information with code pseudorange measurement. This alignment can involve synchronizing the carrier phase and code pseudorange measurements at a specific time instance. Once the carrier phase and code pseudorange measurements are aligned, this alignment is maintained as time progresses. The synchronization established at the initial time point is preserved over subsequent measurements.

The alignment strategy is maintained until certain conditions are met. These conditions can include (but are not limited to) a "loss of signal track," which refers to a situation where the receiver is no longer able to track the satellite signals, and an "unrecoverable cycle slip," which is a sudden discontinuity in the carrier phase measurement that typically occurs due to signal interruptions or interference.

Figure 13:
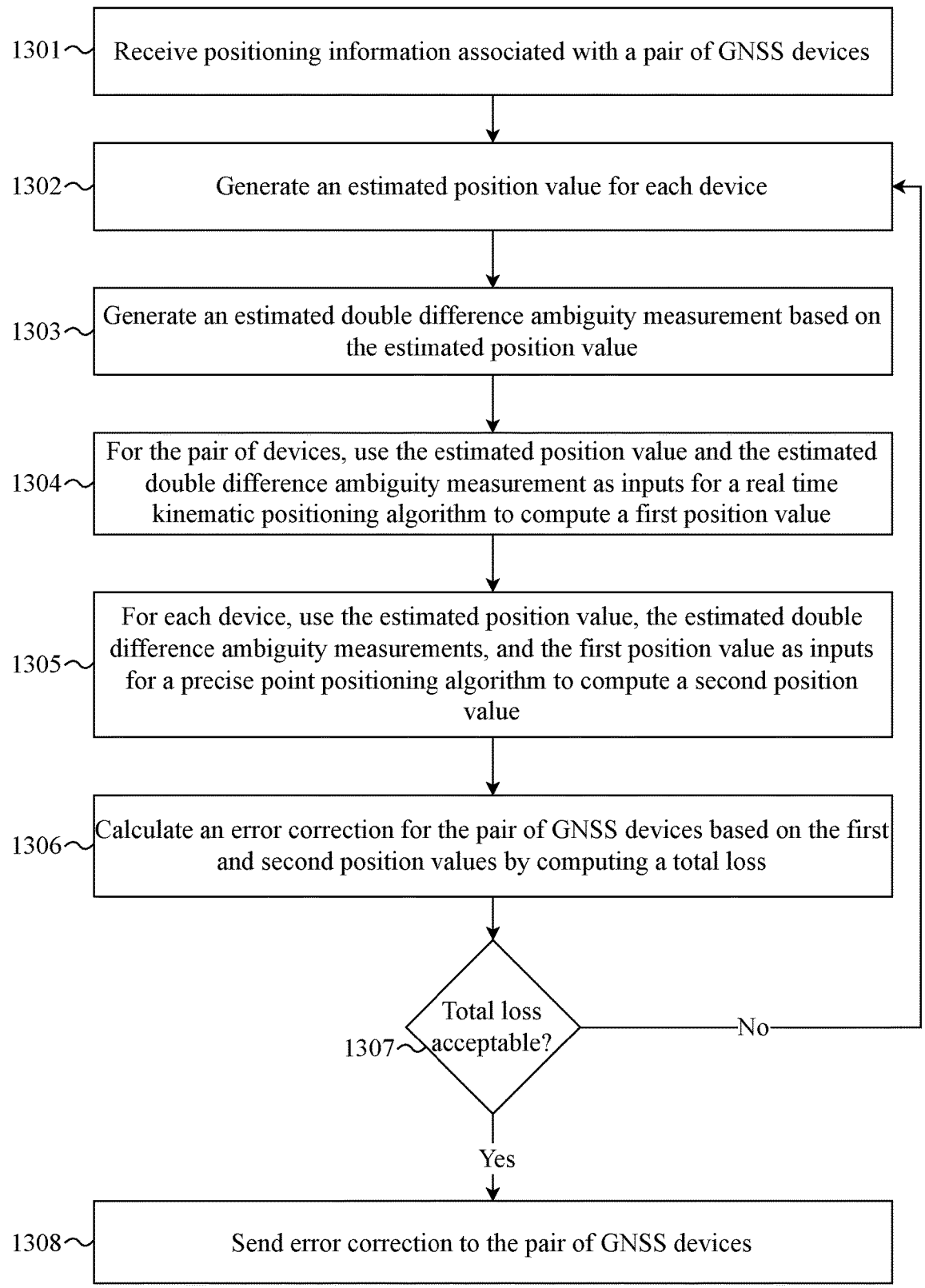
FIG. 13 is a flow diagram illustrating an exemplary method for hybrid position optimization for GNSS devices, according to an embodiment.

FIG. 13 is a flow diagram illustrating an exemplary method for hybrid position optimization for GNSS devices, according to an embodiment. According to the embodiment, the process begins at step 1301 when GNSS LCE receives positional information associated with a pair of GNSS devices. This information may be received, retrieved, or otherwise obtained by hybrid optimizer 1200 and used to provide hybrid optimization for determining the position of GNSS devices. At step 1302, a kinematic Kalman filter 1230 may receive positioning information such as satellite ephemeris, and generate an estimated position value for each device. These estimated position values may then be used as inputs to ambiguity Kalman filter 1240 which can generate estimated double difference carrier phase ambiguity measurements at step 1303. Relative position solver 1220, utilizing RTK techniques with the estimated position values and the estimated double difference carrier phase ambiguity measurements as inputs can compute a first position value at step 1304. At step 1305, absolute position solver 1210 may receive the estimated position value for each device, the estimated double difference ambiguity measurements, and the first position value, and use these values as inputs to a PPP algorithm to compute a second position value for each of the GNSS devices. At step 1306, hybrid optimizer 1200 can calculate an error correction for the pair of GNSS devices based on the first and second position values by computing a total loss. In an embodiment, the total loss is computed by summing the absolute positioning loss and the relative position loss. In an embodiment, the absolute position loss is computed using the second position value. In an embodiment, the relative position loss is computed using the first position value.

Once the total loss has been computed, a check can be made to determine if the computed total loss is acceptable at step 1307. In some embodiments, a predetermined threshold value may be determined, and the computed total loss compared against the threshold value to determine if the total loss is acceptable, wherein if the total loss value is below the predetermined threshold value, then the total loss is acceptable. The threshold value may be selected based on the requirements of the system and/or embodiment. If the total loss is not acceptable, then the process moves to step 1302 and repeats, using the second value as the input to kinematic Kalman filter 1230 which can then generate an updated estimate of the position for each device of the pair of GNSS devices. The process may iterate through the feedback loop until it quickly converges on a precise location. If, instead, the total loss is acceptable, then the process proceeds to step 1308 wherein the calculated error corrections are sent to the pair of GNSS devices.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 14:
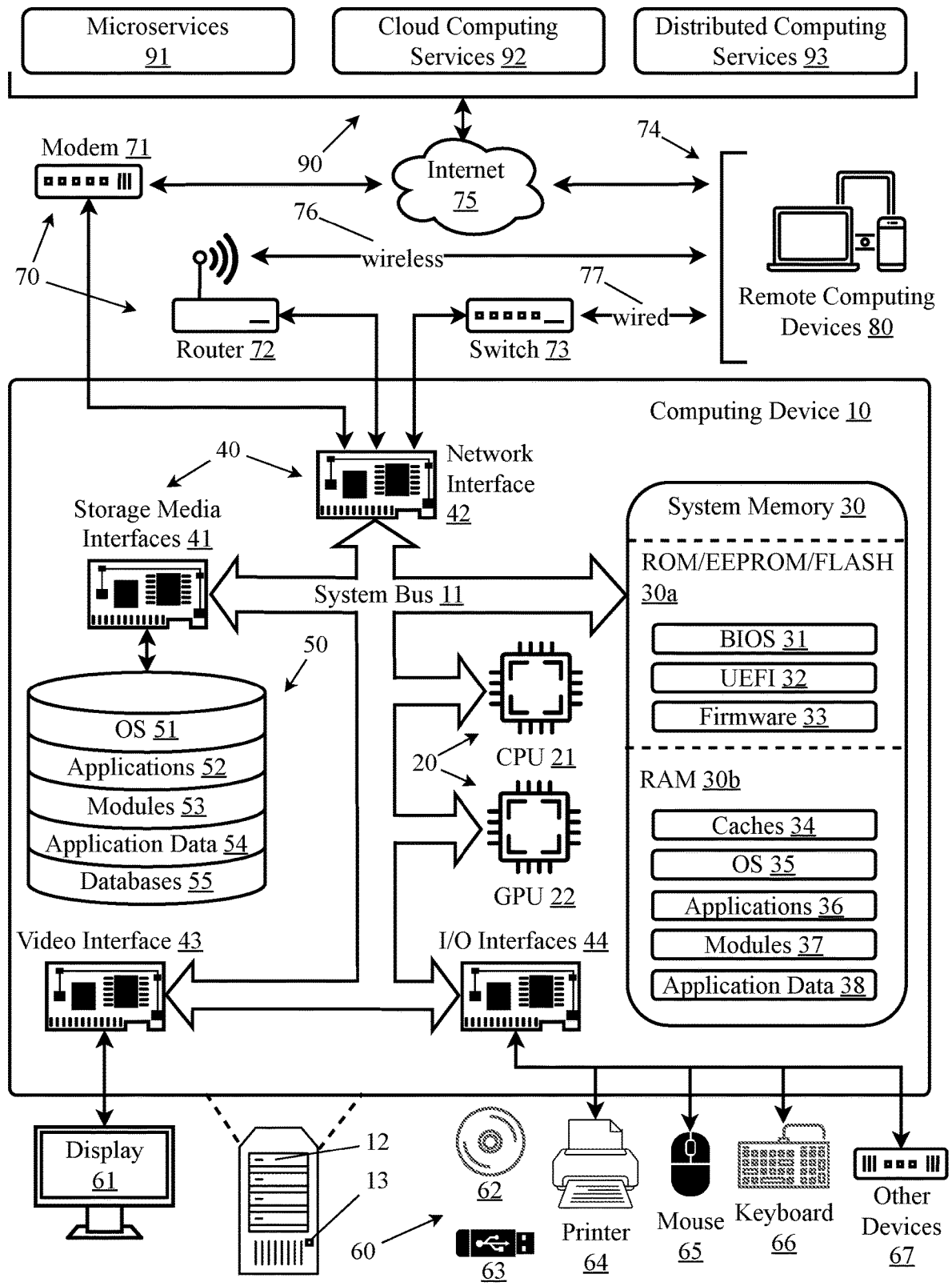
FIG. 14 illustrates an exemplary computing environment on which an embodiment described herein may be implemented, in full or in part.

FIG. 14 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed, or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

What is claimed is:

1. A system for improving positional accuracy in a Global Navigation Satellite System (GNSS) device, comprising:
a server comprising a memory and a processor;
an application programming interface (API) operating on the server, the API comprising a first plurality of programming instructions stored in the memory which, when operating on the processor, causes the API to act as a network interface between applications operating on GNSS devices and a location correction engine operating on the server; and
the location correction engine operating on the server comprising a second plurality of programming instructions stored in the memory which, when operating on the processor, causes the server to:
receive positional information from a pair of GNSS devices via the API, the positional information comprising navigation message data from each GNSS device comprising pseudorange and carrier phase measurements;
for each device, generate an estimated position value to produce an estimated double difference ambiguity measurement;
use the estimated double difference ambiguity measurement and the estimated position value as an input into a real-time kinematic (RTK) algorithm, wherein the RTK algorithm computes a first position value for each of the devices;
input the computed first position, the estimated position value, and the estimated double difference ambiguity measurement into a precise point positioning (PPP) algorithm, wherein the algorithm computes a second position value for each of the devices;
use the second position value to update the estimated position value;
calculate an error correction for the pair of GNSS devices based on the updated estimated position value; and
send the error correction to the pair of GNSS devices.

2. A method for improving positional accuracy in a Global Navigation Satellite System (GNSS) device, comprising the steps of:
receiving positional information from a pair of GNSS devices via an application programming interface, the positional information comprising navigation message data from each GNSS device comprising pseudorange and carrier phase measurements;
for each device, generating an estimated position value to produce an estimated double difference ambiguity measurement;
using the estimated double difference ambiguity measurement and the estimated position value as an input into a real-time kinematic (RTK) algorithm, wherein the RTK algorithm computes a first position value for each of the devices;
inputting the computed first position, the estimated position value, and the estimated double difference ambiguity measurement into a precise point positioning (PPP) algorithm, wherein the algorithm computes a second position value for each of the devices;
using the second position value to update the estimated position value;
calculating an error correction for the pair of GNSS devices based on the updated estimated position value; and
sending the error correction to the pair of GNSS devices.

* * * * *